United States Patent
Moroz et al.

(10) Patent No.: US 10,606,968 B2
(45) Date of Patent: Mar. 31, 2020

(54) ATOMIC SCALE GRID FOR MODELING SEMICONDUCTOR STRUCTURES AND FABRICATION PROCESSES

(71) Applicant: Synopsys, Inc., Mountain View, CA (US)

(72) Inventors: Victor Moroz, Saratoga, CA (US); Stephen Lee Smith, Mountain View, CA (US)

(73) Assignee: SYNOPSYS, INC., Mountain View, CA (US)

( * ) Notice: Subject to any disclaimer, the term of this patent is extended or adjusted under 35 U.S.C. 154(b) by 0 days.

(21) Appl. No.: 16/159,518

(22) Filed: Oct. 12, 2018

(65) Prior Publication Data
US 2019/0147123 A1     May 16, 2019

Related U.S. Application Data

(63) Continuation of application No. 15/841,238, filed on Dec. 13, 2017, now Pat. No. 10,102,318, which is a
(Continued)

(51) Int. Cl.
*G06F 17/00*     (2019.01)
*G06F 17/50*     (2006.01)
*G05B 19/418*     (2006.01)

(52) U.S. Cl.
CPC ... *G06F 17/5009* (2013.01); *G05B 19/41885* (2013.01); *G06F 17/5045* (2013.01); *G06F 2217/16* (2013.01)

(58) Field of Classification Search
CPC ............. G06F 17/5018; G06F 17/5009; G05B 19/41885
See application file for complete search history.

(56) References Cited

U.S. PATENT DOCUMENTS

| | | | |
|---|---|---|---|
| 7,302,375 B2 | 11/2007 | Kucherov et al. | |
| 7,792,595 B1 | 9/2010 | Bomholt et al. | |

(Continued)

FOREIGN PATENT DOCUMENTS

| | | |
|---|---|---|
| JP | 2009129635 A | 6/2009 |
| JP | 2010189586 A | 9/2010 |

(Continued)

OTHER PUBLICATIONS

Wikipedia, "Kinetic Monte Carlo," http://en.wikipedia.org/wiki/Kinetic_Monte_Carlo, 6 pages, accessed Jul. 16, 2014.
(Continued)

*Primary Examiner* — Brian W Wathen
(74) *Attorney, Agent, or Firm* — Haynes Beffel & Wolfeld LLP

(57) ABSTRACT

Roughly described, a system for simulating a temporal process in a body includes a meshing module to impose a grid of nodes on the body, the grid having a uniform node spacing which is less than the quantum separation distance in silicon. A system of node equations is provided, including at least one node equation for each of a plurality of nodes of the grid. The node equations describe behavior of at least one physical quantity at that node through each time step of the process. An iterating module iterates through the time steps to determine values for physical quantities of the body at the end of the simulation period. Preferably one particle of the body is assigned to each node of the grid. For moving boundary processes, boundary movement can be represented simply by changing the particle type assigned to various nodes of the grid as the boundary advances.

17 Claims, 14 Drawing Sheets

Related U.S. Application Data continuation of application No. 14/479,070, filed on Sep. 5, 2014, now Pat. No. 9,852,242.

(56) References Cited

U.S. PATENT DOCUMENTS

| | | | |
|---|---|---|---|
| 8,359,558 | B2 | 1/2013 | Tang et al. |
| 9,852,242 | B2 | 12/2017 | Moroz et al. |
| 10,102,318 | B2 * | 10/2018 | Moroz ............... G06F 17/5009 |
| 10,311,200 | B2 | 6/2019 | Moroz et al. |
| 2003/0215877 | A1 | 11/2003 | Love et al. |
| 2005/0094141 | A1 | 5/2005 | Zechner |
| 2006/0047737 | A1 | 3/2006 | Kucherov et al. |
| 2014/0015135 | A1 | 1/2014 | Rieger et al. |
| 2014/0039847 | A1 | 2/2014 | Georgescu et al. |
| 2016/0378717 | A1 | 12/2016 | Reid |
| 2017/0103153 | A1 | 4/2017 | Asenov |

FOREIGN PATENT DOCUMENTS

| | | |
|---|---|---|
| JP | 2010223879 A | 10/2010 |
| JP | 2011135445 A | 7/2011 |

OTHER PUBLICATIONS

Voter, Arthur, F., "Introduction to the Kinetic Monte Carlo Method," Radiation Effects in Solids, edited by K. E. Sickafus, E. A. Kotomin and B. P. Uberuaga (Springer, NATO Publishing Unit, dordrecht, The Netherlands, 2007), pp. 1-23.
International Technology Roadmap for Semiconductors: 2013, http://www.itrs.net/Links/2013ITRS/Home2013.htm, 2013, 17 pages.
Wettstein, Andreas, "Quantum Effects in MOS Devices," Apr. 2000, 150 pages.
Smith, L. et al., "Design Guidelines for High Mobility Channel Bulk n-MOSFETs", Synopsys, Inc., Oct. 2007, 16 pages.
Sentaurus TCAD: Industry-Standard Process and Device Simulators, Synopsys, Inc., May 2012, 4 pages.
Avci, Uygar E., et al., "Energy Efficiency Comparison of Nanowire Heterojunction TFET and Si MOSFET at Lg=13nm, Including P-TFET and Variation Considerations," 2013 IEEE, IEDM13-830, pp. 33.4.1-33.4.4.
Bernard, et al., "Novel integration process and performances analysis of Low STandby Power (LSTP) 3D multi-channel CMOSFET (MCFET) on SOI with metal / high-K gate stack," 2008 Symp. on VLSI Technology, Jun. 17-19, 2008, 2 pages.
Ma, et al., "Modeling of stress-retarded orientation-dependent oxidation: shape engineering of silicon nanowire channels," 2009 IEEE Electron Devices Meeting, Dec. 7-9, 2009, 4 pages.
PCT/US2015/048702—International Search Report and Written Opinion dated Nov. 30, 2015, 11 pages.
PCT/US2015/048702—International Preliminary Report on Patentability dated Mar. 7, 2017, 8 pages.
EP 15839015.3—Rule 161(2) EPC Communication dated Apr. 18, 2017, 2 pages.
KR 10-2017-7009180—Request for Examination filed May 10, 2017, 25 pages.
U.S. Appl. No. 14/479,070—Office Action dated Jul. 24, 2017, 19 pages.
U.S. Appl. No. 14/479,070—Preliminary Amendment dated Sep. 5, 2014, 13 pages.
U.S. Appl. No. 14/479,070—Notice of Allowance dated Aug. 21, 2017, 8 pages.
U.S. Appl. No. 14/479,070—Response to Office Action dated Jul. 24, 2017 filed Aug. 4, 2017, 17 pages.
EP 15839015.3—Extended Search Report dated Mar. 20, 2018, 12 pages.
Vasileska et al., "Monte Carlo Device Simulations", in "Applications of Monte Carlo Method in Science and Engineering", Feb. 28, 2011, InTech, XP055457572, ISBN: 978-953-30-7691-1, pp. 385-430.
Martin-Bragado, et al., "Fermi-level effects in semiconductor processing: A modeling scheme for atomistic kinetic Monte Carlo simulators", Journal of Applied Physics, American Institute of Physics, US, vol. 98, No. 5, Sep. 12, 2005, pp. 1-7, XP012078498, ISSN: 0021-8979.
U.S. Appl. No. 15/841,238—Office Action dated Apr. 9, 2018, 8 pages.
KR 10-2017-7009180—Notice of Allowance dated Apr. 13, 2018, 3 pages.
U.S. Appl. No. 15/841,238—Notice of Allownace dated Aug. 29, 2018, 11 pages.
U.S. Appl. No. 15/841,238—Response to Office Action dated Apr. 9, 2018 filed Jul. 9, 2018, 2 pages.
EP 15839015.3—Response to Extended Search Report dated Mar. 20, 2018, as filed Oct. 15, 2018, 19 pages.
EP 15839015.3—First Office Action dated Mar. 18, 2019, 12 pages.
Asenov et al., "Integrated Atomistic Process and Device Simulation of Decananometre MOSFETs", Simulation of Semiconductor Processes and Devices (SISPAD) 2002, Sep. 4, 2002, pp. 87-90.
EP 18202288.9—European Extended Search Report, dated Mar. 27, 2019, 14 pages.
Roy et al., "Applicability of Quasi-3D and 3D MOSFET Simulations in the 'Atomistic' Regime", Journal of Computational Electronics, vol. 2, No. 2-4, Dec. 2003, pp. 423-426.
Reid, Large Scale Simulations of Intrinsic Parameter Fluctuations in Nano Scale MOSFETs, Jun. 23, 2010, URL: http://theses.gla.ac.uk/1960/1/2010reidPhD.pdf, pp. 1-148.
EP 15839015.3—Response to First Office Action dated Mar. 18, 2019, as filed Jul. 17, 2019, 51 pages.
Exploring Narrow Width Effect on 45-nm CMOS Device Performance Using 3D TCAD Simulations, Synopsys, Inc., 2011, pp. 1-11.
Babarada et al., "MOSFET process optimization and characteristics extraction," In 2004 International Semiconductor Conference. CAS 2004 Proceedings (IEEE Cat. No. 04TH8748), vol. 2, pp. 319-322. IEEE, 2004.

* cited by examiner

US 10,606,968 B2

ATOMIC SCALE GRID FOR MODELING SEMICONDUCTOR STRUCTURES AND FABRICATION PROCESSES

REFERENCE TO PRIORITY APPLICATION

This application is a continuation of U.S. application Ser. No. 15/841,238, filed Dec. 13, 2017, entitled "ATOMIC SCALE GRID FOR MODELING SEMICONDUCTOR STRUCTURES AND FABRICATION PROCESSES," now U.S. Pat. No. 10,102,318, issued Oct. 16, 2018, which application is a continuation of U.S. application Ser. No. 14/479,070, filed Sep. 5, 2014, entitled "ATOMIC SCALE GRID FOR MODELING SEMICONDUCTOR STRUCTURES AND FABRICATION PROCESSES," now U.S. Pat. No. 9,852,242, issued Dec. 26, 2017, both of which are incorporated by reference herein in their entirety.

BACKGROUND

This invention relates to methods for modeling temporal processes in a body of material in computer aided design (CAD) and electronic design automation (EDA) systems. For example it may be used to model semiconductor fabrication process steps or processes that occur during device operation.

DESCRIPTION OF RELATED ART

Various methods can be used for modeling temporal processes in a body of material. Electron density, mechanical stress and deformation of semiconductor structures, and migration or diffusion of dopants and defects, material reactions during or as results of a fabrication process step can be generally modeled by a continuity equation below that describes the conservation of a quantity q.

$$\frac{dq}{dt} + \oiint_S F \cdot dS = R$$

In the continuity equation above, S is a closed surface enclosing a volume V. $\oiint_S dS$ is a surface integral over the closed surface S. F is the flux of the quantity q or the amount of q flowing through a unit area of the surface per unit time. The continuity equation describes that the sum of the change in the quantity per unit time $$\frac{dq}{dt}$$

and the flux F of the quantity q flowing out of the surface S equals the net rate R at which the quantity q increases (or decreases) within the volume V. As examples, the conserved quantity q can be a number of charged carriers (electrons, holes), atoms, mass, energy, or momentum.

The continuity equation above can also be expressed as a partial differential equation:

$$\frac{\partial d}{\partial t} + \nabla \cdot F = r$$

In the partial differential equation above, d is the density per unit volume of the quantity q. ($\nabla \cdot$) is the divergence operator that represents the outward flux F of the quantity q from a unit volume (e.g., an infinitesimal volume). And r is the net rate that the quantity q increases (or decreases) per unit time per unit volume.

The continuity equations above describe the behavior of the quantity d in a particular volume during the time period of interest. What is typically desired, however, are the values of d for numerous positions within a body being modeled, at the end of a particular period of time being modeled. Various methods can be used to determine these values. For example, a finite-difference method can be used for solving the continuity equation in the partial differential equation form. In solving the continuity equation with the finite difference method, a body being modeled (e.g., the volume V above) is discretized into a grid of nodes, and the partial differential equation above is applicable to each node of the grid. These equations, being dependent upon one another, form a system of simultaneous equations (sometimes referred to herein as "node equations"). The process is further discretized into discrete time steps from the beginning to the end of a process period of interest. Thus the finite-difference method involves solving the system of node equations as a system of simultaneous equations, iteratively through discrete time steps of the process period of interest.

The solution of large sets of continuity equations is a cornerstone of semiconductor device design and characterization, as well as semiconductor fabrication process design and characterization. Established products that solve such equations are Sentaurus Device and Sentaurus Process, respectively, both available from Synopsys, Inc., Mountain View, Calif.

Bodies to be modeled often include boundaries. For example, a nano wire to be modeled has a substantially cylindrical shape, and has a boundary along its circumference at which the nano wire material meets air or another external material. Such boundaries are rarely straight and rectangular. In addition, behavior of the process very near the boundary typically must be modeled very carefully, while away from the boundary the material can be assumed to behave more uniformly. Therefore, it is common to impose a grid of nodes on the body which is irregular, dividing the body much more finely near the boundaries and increasing the grid size away from the boundary. Typically a triangular or tetrahedral grid of nodes is used, because those shapes are often good at fitting curved boundaries. However, solving a system of partial differential equations such as the continuity equation using the finite difference method and an irregular grid of nodes can result in an irregular matrix that requires more computing time and is difficult to parallelize. Moreover, for a moving-boundary problem such as in modeling a boundary between silicon and silicon oxide during a process step of oxide growth, generation of a new grid of nodes for each time step can be time consuming and troublesome.

SUMMARY

An opportunity arises to improve the way that processes occurring with respect to a body are simulated.

Roughly described, a system for simulating a temporal process in a body includes a meshing module to impose a grid of nodes on the body, the grid having a uniform node spacing which is less than the quantum separation distance in silicon. A system of node equations is provided, including at least one node equation for each of a plurality of nodes of the grid. The node equations describe behavior of at least one physical quantity at that node through each time step of the process. An iterating module iterates through the time steps to determine values for physical quantities of the body at the end of the simulation period. Preferably one particle of the body is assigned to each node of the grid. For moving boundary processes, boundary movement can be represented simply by changing the particle type assigned to various nodes of the grid as the boundary advances.

Aspects of the invention also apply to processes modeled by node equations other than partial differential equations, such as the discrete time probability equations as used in Kinetic Monte Carlo (KMC) simulations of various processes. The technique is especially powerful when used to model processes described with interrelated equations of more than one type.

The above summary of the invention is provided in order to provide a basic understanding of some aspects of the invention. This summary is not intended to identify key or critical elements of the invention or to delineate the scope of the invention. Its sole purpose is to present some concepts of the invention in a simplified form as a prelude to the more detailed description that is presented later. Particular aspects of the invention are described in the claims, specification and drawings.

BRIEF DESCRIPTION OF THE DRAWINGS

The invention will be described with respect to specific embodiments thereof, and reference will be made to the drawings, in which.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

Integrated Circuit Manufacturing Flow

Figure 11:
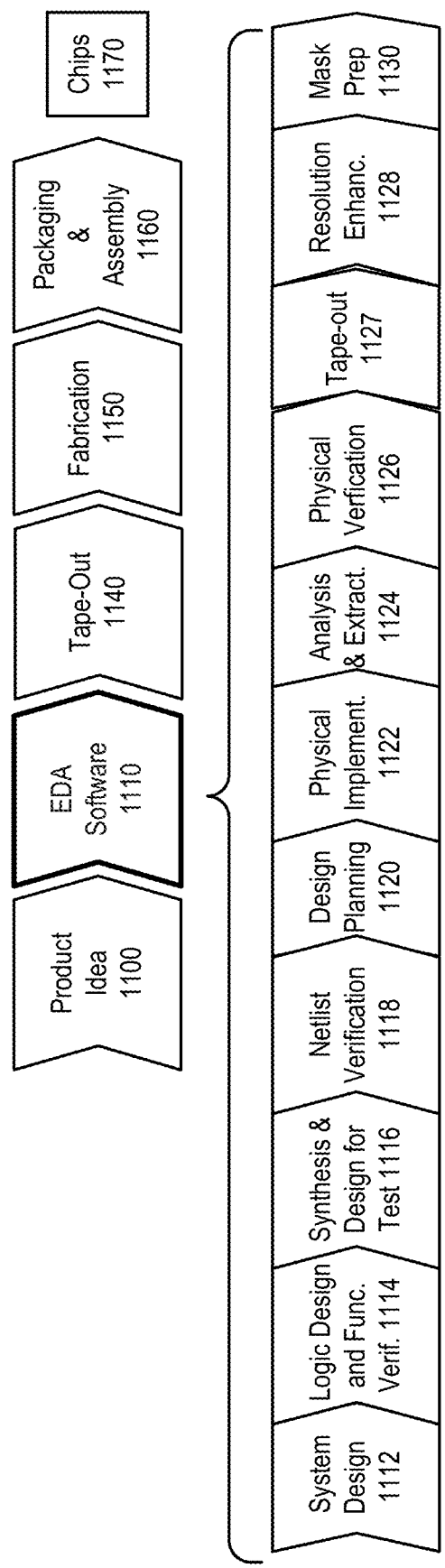
FIG. 11 shows a simplified representation of an illustrative integrated circuit design flow incorporating features of the technology.

FIG. 11 shows a simplified representation of an illustrative integrated circuit design flow incorporating features of the technology. At a high level, the process starts with the product idea (step 1100) and is realized in an EDA (Electronic Design Automation) software design process (step 1110). When the design is finalized, it can be taped-out (step 1140). After tape out, the fabrication process (step 1150) and packaging and assembly processes (step 1160) occur resulting, ultimately, in finished integrated circuit chips (result 1170).

The EDA software design process (step 1110) is actually composed of a number of steps 1112-1130, shown in linear fashion for simplicity. In an actual integrated circuit design process, the particular design might have to go back through steps until certain tests are passed. Similarly, in any actual design process, these steps may occur in different orders and combinations. This description is therefore provided by way of context and general explanation rather than as a specific, or recommended, design flow for a particular integrated circuit.

A brief description of the components steps of the EDA software design process (step 1110) will now be provided.

System design (step 1112): The designers describe the functionality that they want to implement, they can perform what-if planning to refine functionality, check costs, etc. Hardware-software architecture partitioning can occur at this stage. Example EDA software products from Synopsys, Inc. that can be used at this step include Model Architect, Saber, System Studio, and DesignWare® products.

Logic design and functional verification (step 1114): At this stage, the VHDL or Verilog code for modules in the system is written and the design is checked for functional accuracy. More specifically, the design is checked to ensure that produces the correct outputs in response to particular input stimuli. Example EDA software products from Synopsys, Inc. that can be used at this step include VCS, VERA, DesignWare®, Magellan, Formality, ESP and LEDA products.

Synthesis and design for test (step 1116): Here, the VHDL/Verilog is translated to a netlist. The netlist can be optimized for the target technology. Additionally, the design and implementation of tests to permit checking of the finished chip occurs. Example EDA software products from Synopsys, Inc. that can be used at this step include Design Compiler®, Physical Compiler, Test Compiler, Power Compiler, FPGA Compiler, Tetramax, and DesignWare® products.

Netlist verification (step 1118): At this step, the netlist is checked for compliance with timing constraints and for correspondence with the VHDL/Verilog source code. Example EDA software products from Synopsys, Inc. that can be used at this step include Formality, PrimeTime, and VCS products.

Design planning (step 1120): Here, an overall floor plan for the chip is constructed and analyzed for timing and top-level routing. Example EDA software products from Synopsys, Inc. that can be used at this step include Astro and IC Compiler products.

Physical implementation (step 1122): The placement (positioning of circuit elements) and routing (connection of the same) occurs at this step. Example EDA software products from Synopsys, Inc. that can be used at this step include the Astro and IC Compiler products.

Analysis and extraction (step 1124): At this step, the circuit function is verified at a transistor level, this in turn permits what-if refinement. Example EDA software products from Synopsys, Inc. that can be used at this step include AstroRail, PrimeRail, Primetime, and Star RC/XT products.

Physical verification (step 1126): At this step various checking functions are performed to ensure correctness for: manufacturing, electrical issues, lithographic issues, and circuitry. Example EDA software products from Synopsys, Inc. that can be used at this step include the Hercules product.

Tape-out (step 1127): This step provides the "tape out" data for production of masks for lithographic use to produce finished chips. Example EDA software products from Synopsys, Inc. that can be used at this step include the CATS® family of products.

Resolution enhancement (step 1128): This step involves geometric manipulations of the layout to improve manufacturability of the design. Example EDA software products from Synopsys, Inc. that can be used at this step include Proteus, ProteusAF, and PSMGen products.

Mask data preparation (step 1130): This step provides the "tape-out" data for production of masks for lithographic use to produce finished chips. Example EDA software products from Synopsys, Inc. that can be used at this step include the CATS® family of products.

A typical integrated circuit manufacturing flow also includes a related flow, as follows:

(1) Develop individual process steps for manufacturing the integrated circuit. This can be modeled with the Synopsys tools "Sentaurus Process", "Sentaurus Topography", and "Sentaurus Lithography," all using aspects of the invention as described herein. The input information here includes process conditions like temperature, reactor ambient, implant energy, etc. The output information is the changes in geometry or doping profiles or stress distribution. Aspects of the invention can be used in this step of the manufacturing flow.

(2) Integrate the individual process steps into the complete process flow. This can be modeled with the Synopsys tool "Sentaurus Process". The input information here includes the collection of the process steps in the appropriate sequence. The output includes the geometry, the doping profiles, and the stress distribution for the transistors and the space in between the transistors. Aspects of the invention can be used also in this step of the manufacturing flow.

(3) Analyze performance of the transistor manufactured with this process flow. This can be done with the Synopsys tool "Sentaurus Device". The input information here includes the output of step (2) and the biases applied to transistor terminals. The output information includes the currents and capacitances of the transistors for each bias combination. Aspects of the invention can be used also in this step of the manufacturing flow.

The output information developed in step (3) characterizes the transistors made using the process, and the characteristics are then provided to circuit simulators such as HSPICE in order to permit a designer to analyze circuit designs at a transistor level. By analyzing the circuit at to transistor level, the designer is able to develop better designs.

(4) If necessary, modify the process steps and the process flow to achieve the desired transistor performance. This can be done iteratively by using the Synopsys tools mentioned above.

Once the process flow is ready, it can be used for manufacturing multiple circuit designs coming from various designers in various companies. The EDA flow 1112-1130 will be used by such designers. The parallel flow described here can be used for example at a foundry to develop a process flow that can be used to manufacture designs coming from the designers. A combination of the process flow and the masks made from step 1130 are used to manufacture any particular circuit. If the designers are at a different company, e.g. a fabless company, then usually it is the foundry that performs this parallel process flow whereas the process steps of FIG. 11 are performed typically by the fabless company. If the integrated circuit is manufactured at an IDM (integrated device manufacturer) company instead of the combination of a fabless company and a foundry, then both parallel flows described above are done at the same IDM company.

There is also a bridge between these tools and the 1112-1130 EDA tools. The bridge is a Synopsys tool "Seismos" that applies compact proximity models for particular circuit design and layout to obtain netlist with instance parameters for each individual transistor in the circuit as a function of its neighborhood and stress, including material conversion stress. This netlist is used in the analysis step 1124.

Figure 12:
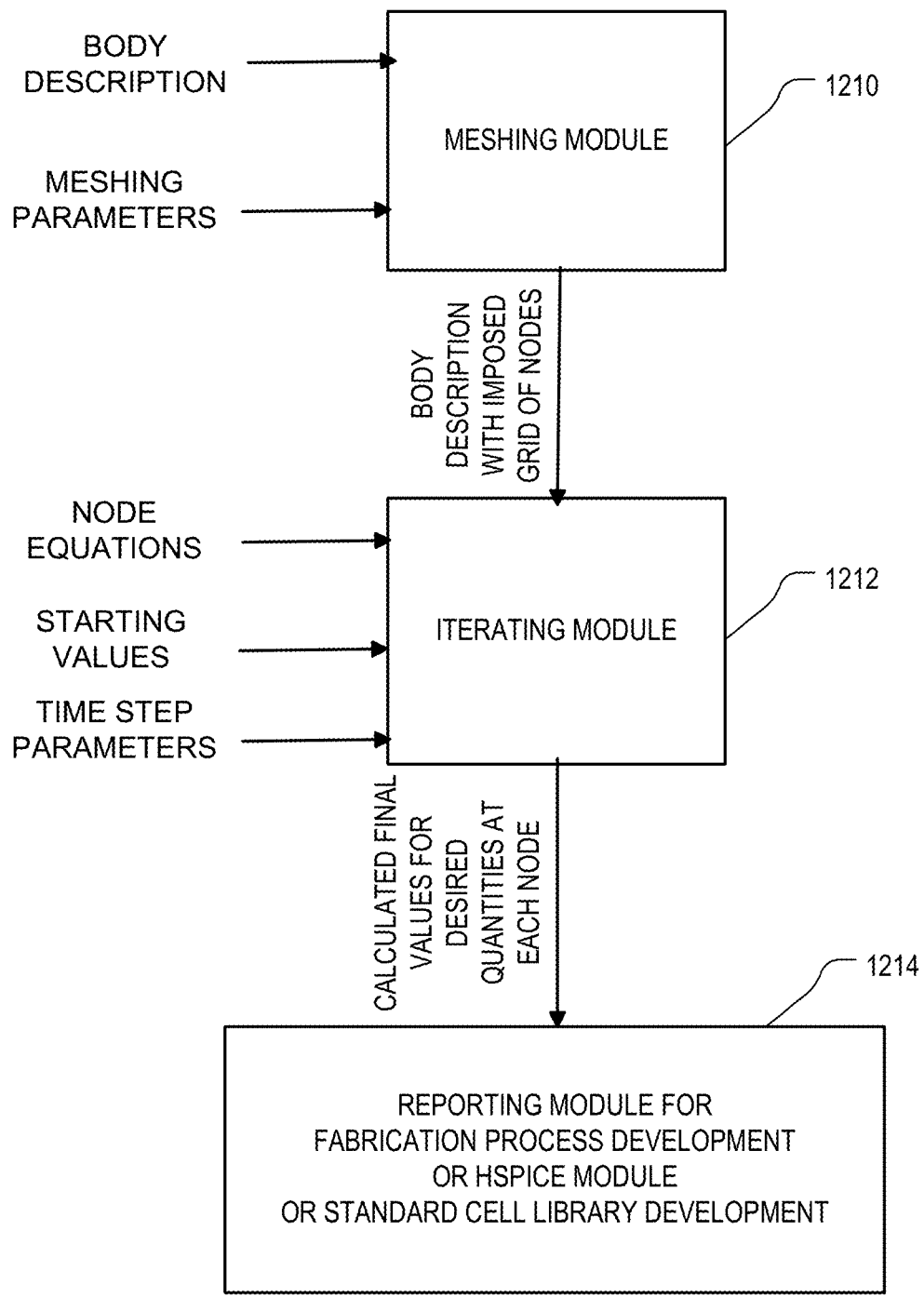
FIG. 12 illustrates use of a system implementing aspects of the invention in the related flow.

FIG. 12 illustrates the use of a system implementing aspects of the invention in the related flow. It can be used in several of the steps of the related flow. The system includes a meshing module 1210, which receives from a user a description of the body to be modeled, and the parameters to be used in imposing the mesh on the body. The body need not be an entire structure (such as an entire transistor). In fact it is often equally accurate and far more efficient to use only one quadrant or one octant of the overall structure, and establish reflective boundary conditions at the quadrant faces.

The meshing parameters include the coordinate range of the desired grid in each of the three dimensions, and a single value indicating the uniform spacing to be established between nodes in all three dimensions. Preferably, as described herein, the uniform spacing is no larger than the quantum separation distance in Silicon, and even more preferably is within 10% of the atomic size of a silicon atom. Even more preferably it is the same as the atomic size of a silicon atom. Also, preferably, the grid dimensions are mutually orthogonal. Module 1210 is referred to sometimes herein as a "meshing" module, but it is often best to think of the mesh as merely implied by the grid nodes.

Module 1210 imposes the grid of nodes onto the body to be modeled, in the sense that each node is assigned a position in or around the body. A node data structure is populated for each node, which includes an indication of the position of the grid node in the body (in three dimensions), and values for various properties of the body at that position. In one embodiment the position of a node is identified explicitly within the node's data structure, but in another embodiment the node data structures are themselves organized into a three-dimensional array, with position of each node being implied by the uniform node spacing and the set of three array indices for the node. For some purposes (described elsewhere herein), for example if the body material is a crystal lattice structure whose lattice nodes do not match the exact positions of the grid nodes, the node data structure also may include an indication of the position of the corresponding lattice node.

A "property", as used herein, is a quantity applicable to each node. Properties include whatever properties are referenced in the node equations. Examples include relative permittivity and resistivity (for certain types of device modeling), diffusivity (for certain types of process modeling), and mechanical strength (for certain types of mechanical modeling). Properties are usually fixed during the simulated process, but sometimes they can change due to changes that take place at neighboring nodes. For example, if the oxygen concentration in the region of a particular node increases, so that a silicon region begins to behave more like $SiO_2$, then it might be appropriate to change the properties of the particular node to those of $SiO_2$ rather than pure Si. This situation can arise, for example, when modeling a $SiO_2$ growth process, or another process that involves boundary movement. Properties usually are quantities of the material, but for certain types of node equations they might also include non-material quantities such as quantities of fields in the vicinity of a node. An example of the latter is electric field strength. Properties can also include externally applied quantities, such as those resulting at a particular node position from an electric field applied externally to the body being modeled.

Meshing module 1210 outputs a description of the body with the imposed grid of nodes. The output is in a predefined format. In one embodiment the output is written to a non-transitory computer readable medium such as a disk drive or computer memory.

The output of meshing module 1210 is provided to an iterating module 1212, which may include a Technology Computer Aided Design (TCAD) module, such as Sentaurus Process, Sentaurus Topography, Sentaurus Lithography, or Sentaurus Device, all available from Synopsys, Inc., Mountain View, Calif. Different ones of these tools would be used as iterating module 1212, depending on the particular type of temporal process to be modeled. The iterating module 1212 models the behavior of a material structure during a time-varying process, by simulating the behavior on a computer system. A user also provides the node equations to iterating module 1212, starting values for various quantities referenced in the node equations as well as time step parameters (such as the duration of each time step and the maximum number of time steps to calculate).

Iterating module 1212 provides as output an indication of the values calculated by the simulation, for the quantity or quantities of interest, as they are predicted to be at each node of the grid at the end of the simulation period. Like the output of meshing module 1210, the output of iterating module 1212 is provided in a predefined format. The output is reported to a user by a reporting module 1214. In one embodiment the output is written to a non-transitory computer readable medium such as a disk drive or computer memory, and in a further embodiment the output can be provided to a visualization module which presents the distribution of quantities across the body in a visual form which simplifies user interpretation of the results.

The results are then used, in various embodiments, for a variety of real world aspects of building or improving integrated circuit devices. In one embodiment, for example, the results are used to develop or improve a fabrication process flow that can be used to manufacture designs. A combination of the process flow and the masks made from step 1130 are used to manufacture any particular circuit. In another embodiment the results are used to characterize or improve transistors and other devices. In other embodiments the results are used to develop HSPICE models of integrated circuit devices, in order to enable designers to develop better circuit designs and layouts. In yet other embodiments the results are used to improve process flow to achieve the desired transistor performance. Thus the numerical values obtained by the methods and systems described herein are used for real world technological development or implementation of semiconductor manufacturing processes or circuit designs.

Figure 1:
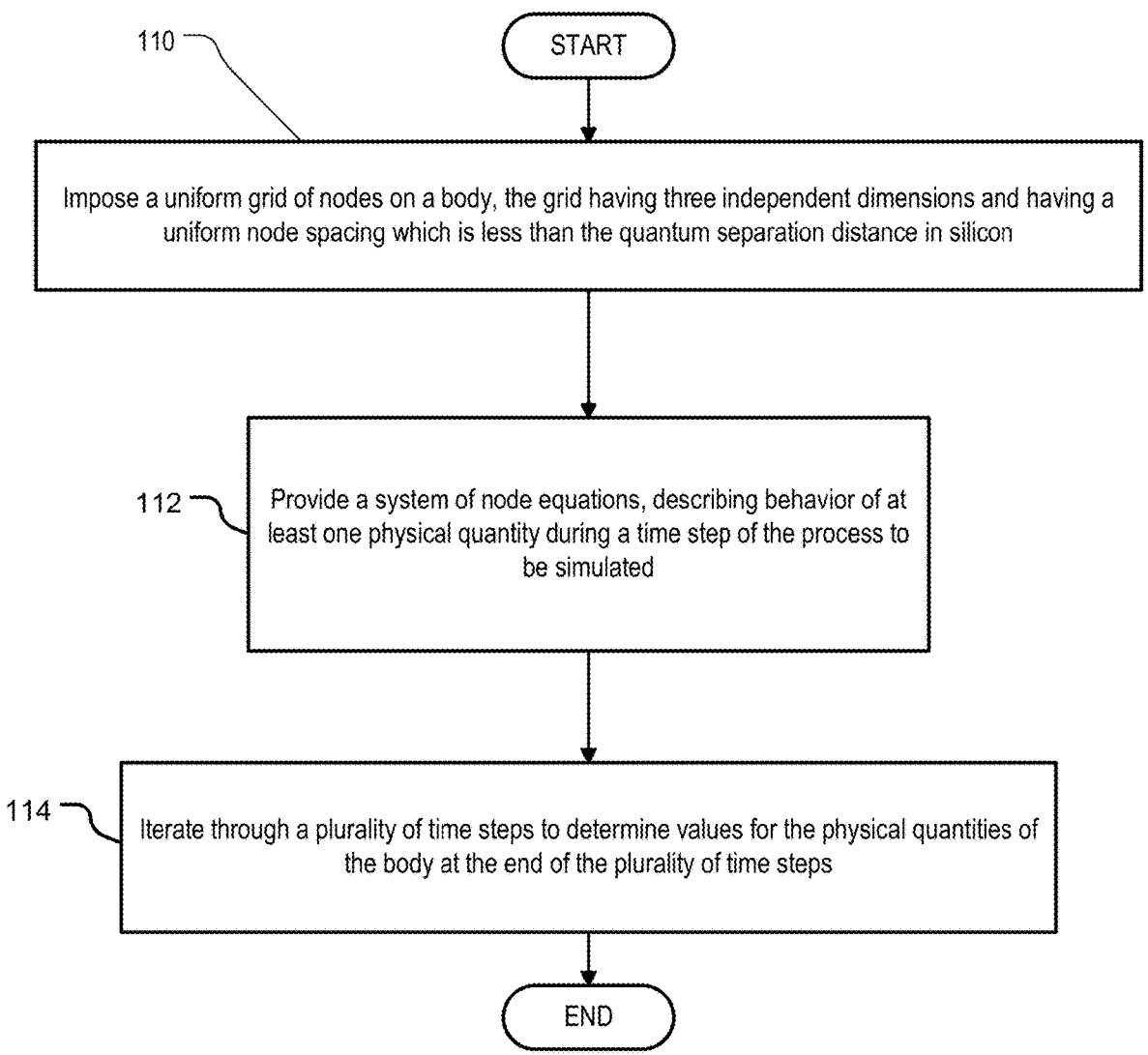
FIG. 1 is a flow chart of a method used by the system of FIG. 12 in modeling semiconductor structures and fabrication process steps in a CAD system.

FIG. 1 is a flow chart of a method used by the system of FIG. 12 in modeling semiconductor structures and fabrication process steps in a CAD system. The method of FIG. 1 can be implemented by one or more computing processes executing on one or more computer systems. At Step 110, the method imposes a uniform grid of nodes on the body to be modeled. The grid has three independent dimensions and has a uniform node spacing which is less than the quantum separation distance in silicon. Step 110 can be performed by meshing module 1210 (FIG. 12).

At step 112, a system of node equations is provided, describing behavior of at least one physical quantity during a time step of the process to be simulated. These node equations are provided to iterating module 1212 (FIG. 12). The node equations in the system of node equations describe the behavior at a local level (i.e. at each node) through a discrete time step. The system of node equations need not be of only a single type. In one particularly useful example, it may include both a sub-system of partial differential equations and also a sub-system of probability equations. The term "system", as used herein, thus encompasses a multiplicity of equations both because (1) each node has at least one equation, and typically three (one for each axis); and also (2) there may be equations for more than one phenomenon at each node (e.g. a PDE (partial differential equation) and a probability equation). The equations for these different phenomena may be interrelated, in the sense that quantities determined by solving the equations for one phenomenon are used in solving the equations for the other phenomenon and vice-versa, but in some embodiments, for simplicity of computation they are not all solved as a single system of simultaneous equations. The term "sub-system" is sometimes used herein to refer to a set of equations that together make up a "system" of equations, but which are not all solved together with other sub-systems as a single system of simultaneous equations. A "sub-system" of equations is itself considered herein to constitute a "system" of equations. In some embodiments more than two sub-systems of equations are included.

The system of node equations includes at least one node equation for each node of the grid. The node equations describe the values of one or more quantities of interest that will exist at the node at the end of the time step, as a function of (1) values of quantities at the particular node and adjacent nodes at the beginning of the time step, (2) values of one or more properties of the material at the particular node and possibly at nearby nodes, and (3) values of zero or more additional parameters established for purpose of the simulation. The quantities described in the node equations can be any time varying aspect of the structure which the simulation is intended to determine. In a simulation intended to find the distribution of dopant concentration after an annealing step, for example, a quantity of interest might be the concentration of the dopant at each node at the end of the simulation. Other quantities of interest in various embodiments include defect locations, material structures, electron density, current, capacitance, and mechanical stress. The quantities are physical quantities, meaning they identify a value for some physical aspect of the body of material at a particular time. Assuming adequate instrumentation, these quantities can be measured. "Quantity" also includes intermediate quantities, which are also physical. For example, in an embodiment which includes two subsystems of node equations, quantities determined in a particular time step by one sub-system might be considered intermediate quantities for purposes of the other sub-system.

At step 114, iterating module 1212 iterates through a first plurality of time steps to determine values for at least a subset of the physical quantities of the body at the end of the first plurality of time steps.

Figure 2:
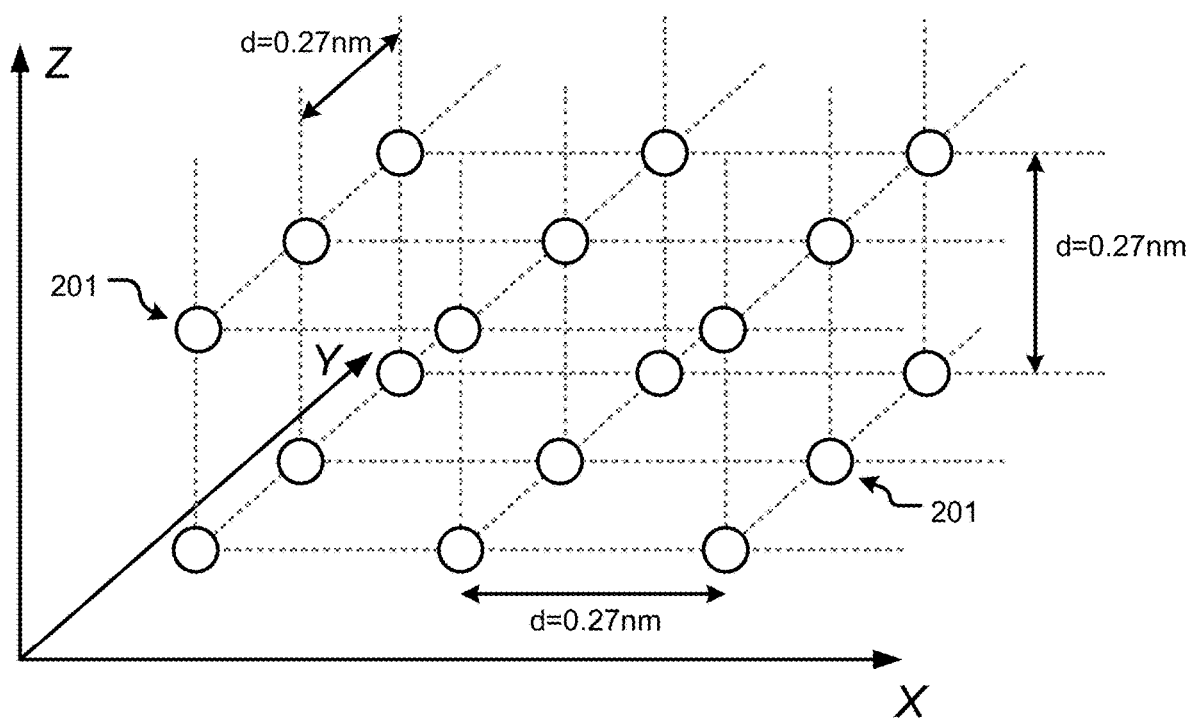
FIG. 2 is a perspective view of a three-dimensional grid of nodes that can be used for the method of FIG. 1.

FIG. 2 is a perspective view of a three-dimensional grid of nodes that can be used for the method of FIG. 1. In this example, nodes 201 are placed along the linear and independent x, y and z direction of a Cartesian coordinate system. Each pair of adjacent nodes in the x, y, or z direction is spaced by an equal distance d. As used herein, the grid in FIG. 1 is referred to as a uniform grid because all of the Voronoi volumes have the same shape of polyhedrons (e.g., cubes with grid nodes in the middle of each cube) with the same size. The grid illustrated in FIG. 2 is used to model a three dimensional body. The boundaries and regions of the body itself may or may not align with a Cartesian coordinate system.

Figure 3:
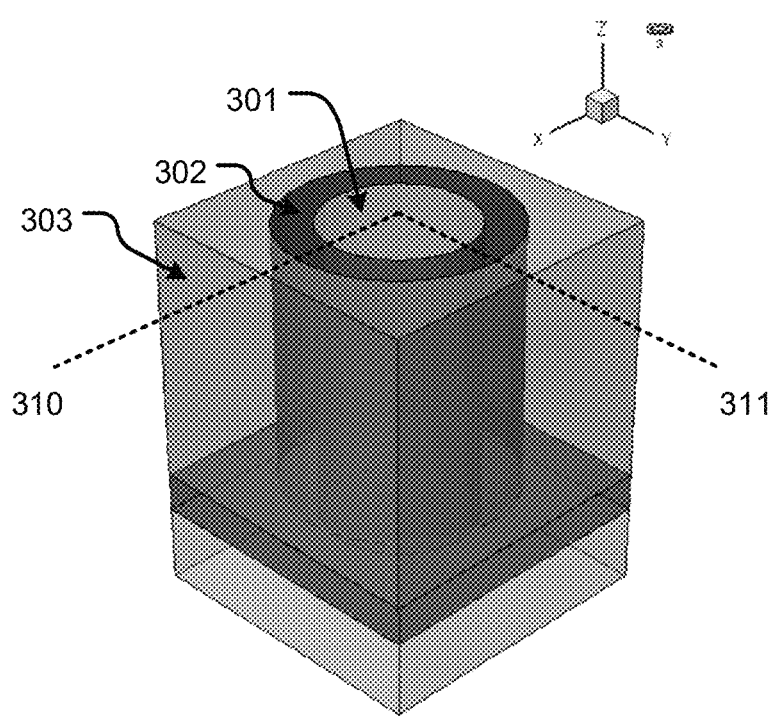
FIG. 3 is a perspective view of a nano wire.

FIG. 3 is a perspective view of an example three-dimensional structure that can be modeled using a grid such as that of FIG. 2. In FIG. 3, the structure is a nano wire. The nano wire can be a conductor (a conducting wire), but in FIG. 3 the nano wire is a transistor because a portion of the nano wire is surrounded by a gate stack structure (e.g., a gate dielectric and a metal gate). In particular, the nano wire includes an inner silicon cylindrical region 301 surrounded by a dielectric sheath, designated as layer 302. The diameter of the silicon cylindrical region 301 is about 3 nanometers. The thickness of the dielectric layer 302 is about 2 nanometers. The nano wire is surrounded by metal gate 303. The portion of the nano wire between dashed lines 310 and 311 in FIG. 3 can be modeled by a uniform grid of equally-spaced nodes such as the one illustrated in FIG. 2.

Figure 4:
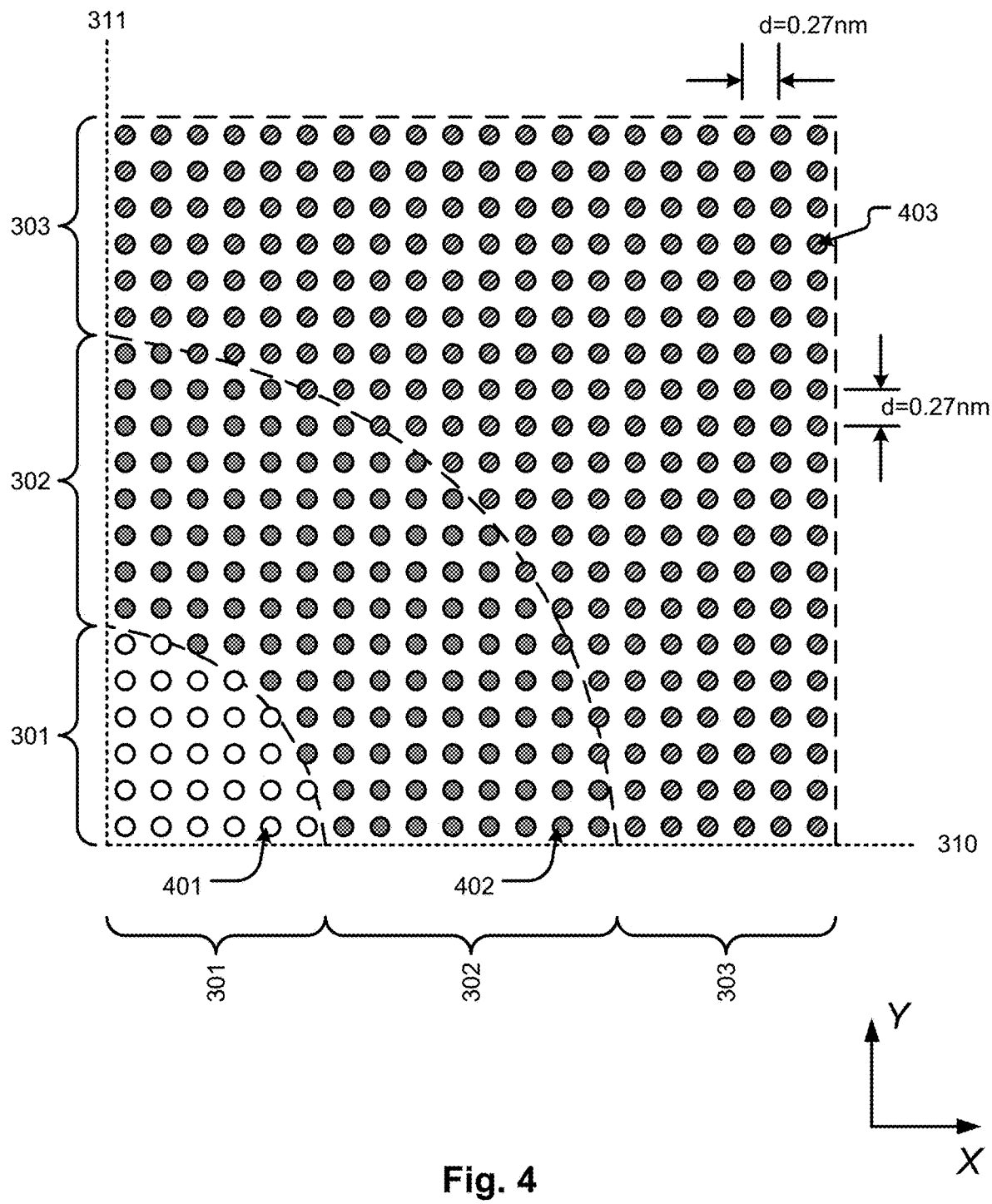
FIG. 4 is a cross-sectional view of a grid of equally-spaced nodes for modeling a portion of a nano wire.

FIG. 4 is a cross-sectional view of a grid of equally-spaced nodes for modeling the quadrant of the nano wire between dashed lines 310 and 311 in FIG. 3. As shown in the example of FIG. 4, the grid includes nodes that are equally spaced at the same distance d in the x and y directions. Each node in the grid belongs to a particular one of the silicon cylindrical region 301, the dielectric layer 302, or the metal gate region 303, as indicated by different shades of circles in FIG. 4. Because the nodes are equally spaced in the Cartesian coordinates, a boundary between nodes belonging to two different regions may not necessarily follow the curved boundaries of the nano wire structure of FIG. 3 (e.g., curved dashed lines shown in FIG. 4).

Figure 5:
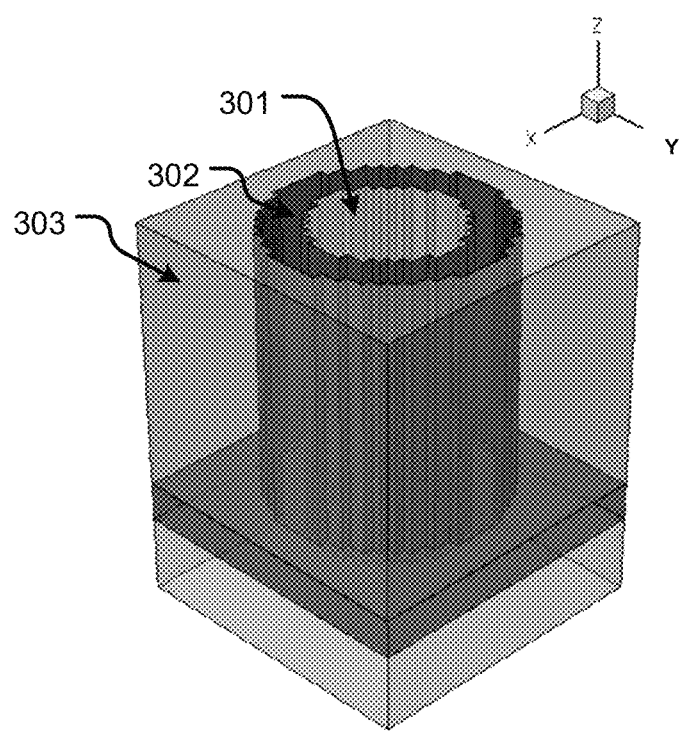
FIG. 5 is a perspective view of a nano wire on which has been imposed a uniform grid of equally-spaced nodes.

FIG. 5 is a perspective view of the nano wire of FIG. 3 on which has been imposed a uniform grid of equally-spaced nodes in the x, y, and z directions described above. As shown in FIG. 5, the boundary formed between nodes belonging to the silicon cylindrical region 301 and the dielectric layer 302, and the boundary formed between nodes belonging to the dielectric layer 302 and the metal gate region 303, do not follow the cylindrical boundaries of the nano wire of FIG. 3.

In the grid illustrated in FIG. 4, each node is assigned values for one or more properties (e.g., relative permittivity, resistivity, band structure, and mechanical properties) of the region to which the node belongs. For example, a node that belongs to the dielectric layer 302 is assigned one value for relative permittivity, whereas a node that belongs to the cylindrical silicon region 301 is assigned a different value for relative permittivity. As another example, assuming for illustrative purposes that the silicon cylindrical region 301 is doped with phosphorus at a particular concentration, a node that belongs to the cylindrical silicon region 301 may be assigned a particular corresponding mobility value and a particular corresponding sheet resistivity value.

The property values assigned to individual nodes depend on the material of the region to which the node belongs. However, several different approaches can be taken, either in a single embodiment or in different embodiments, for determining the particular values to assign. In one approach, the property values assigned are those for the material of the region in bulk. The material might be a structure containing only a single atomic element (e.g. silicon), or it might be a structure containing only a single compound, or a mixture of particle types. In this approach the material is considered in bulk. For example, the material of the region to which a particular node belongs may be silicon, oxide, nitride, silicide, etc. In this first approach some or all of the property values to be assigned can be taken from known values for bulk silicon, oxide, nitride silicide, etc. This approach may require certain adjustments for regions having very small volume.

In a second approach, each node is assigned one particle type, and the property values assigned to the node derives from that particle type. For example, if the material in a particular region is a mixture of two atomic elements, then in this second approach, some of the grid nodes in the region are assigned to be one of the elements, and others are assigned to be the other element, and they are assigned to grid nodes in the same ratio that they exist in the region. The property values for grid nodes that are assigned to be the first element are assigned the property values of the first element, whereas the grid nodes that are assigned to be the second element are assigned the property values of the second element. This second approach requires that care be taken when assigning bulk material property values to individual grid nodes, because for certain kinds of material combinations the per-particle properties may be meaningless. For SiO2, for example, the material property values to assign to a particular grid node that is designated to be silicon, should be based on the neighborhood of the silicon atom that includes several adjacent atoms.

In a third approach, grid nodes in a particular region can be assigned property values which differ from each other in dependence upon a concentration or other field strength at the particular grid node. For example, if the material in a region is not pure (e.g. a crystal lattice structure that includes dopant atoms), and the concentrations of the impurities within the region are known, then instead of assigning the bulk material to most grid nodes and the impurities to the remainder of the grid nodes in the appropriate proportions, all the grid nodes can be assigned to be a composite material and an adjustment is made directly in the translation to assigned property values. Thus in a region of silicon doped with a particular concentration of boron, the value assigned to all the grid nodes in the region for resistivity may be a known value for resistivity of bulk silicon with that same concentration of boron. In some embodiments, if concentration of an impurity varies in a known manner within the region, the value assigned for a particular property may be made to vary accordingly among the various grid nodes. In addition to doped semiconductor materials, this third approach may also be useful for such quantities as electrostatic potential.

In all three of the above approaches, exactly one particle type is assigned to each grid node, but it is not necessary that the grid nodes be located at the same positions as a corresponding particle in the body being modeled. Note that as used herein, the term "particle type" also includes vacancies, holes and defects in a crystal lattice structure.

An approach which assigns individual particles to individual grid nodes is greatly simplified where, as here, the grid node spacing approaches atomic sizes. In addition, such an approach can also greatly simplify simulations of certain kinds of processes, such as processes which involve moving boundaries between materials. For example, in an oxidation process to form SiO2, the boundary between the silicon region and the oxide region moves as silicon is consumed and the oxide is formed. Such a process is very difficult to simulate accurately using an irregular grid of tetrahedrons, in part because of the need to re-mesh the boundary region after each time step. These difficulties are avoided entirely in an approach which assigns individual particles to individual nodes of a uniform grid of atomic size, since when the boundary moves, the nodes that were previously assigned to be silicon atoms are now simply re-assigned to be SiO2 molecules (or one of the variations in the several approaches as described above). More particularly, for example, if after a particular time step the concentration of oxygen in the neighborhood of a particular grid node that had been assigned to be silicon, has increased above a predetermined threshold concentration, the grid node is simply re-assigned for the next time step to be a SiO2 particle and the property values of SiO2 are applied instead of those of silicon. Other variations on this technique will be apparent to the reader.

The equal spacing between each pair of adjacent nodes of the grid in the x, y, and z directions in the embodiment of FIG. 2 is less than the quantum separation distance in silicon. Quantum separation is a quantum mechanical phenomenon that the majority of electrons are located away from the gate oxide interface of a metal-oxide-semiconductor (MOS) transistor in the inversion mode. According to classical electrodynamics, electron density is zero within the gate oxide, jumps to its maximum value at the oxide-silicon interface, and gradually fades toward the inside of the silicon. However, quantum mechanically, because electrons (and holes) are more accurately described as probability waves that change continuously, electron density does not jump from zero to its maximum value at the oxide-silicon interface. Instead, electron density is zero at the oxide-silicon interface, reaches its peak value at some particular distance into the silicon, and then gradually fades toward the inside of the silicon. As used herein, the quantum separation distance is the distance away from the oxide-silicon interface, at which the electron density centroid is located. It is known to be equal to about 1-2 nanometers depending on the material. As dimensions of transistor gate structures decrease to about only one to two orders of magnitude larger than atomic sizes, quantum effects such as quantum separation become important.

Figure 6:
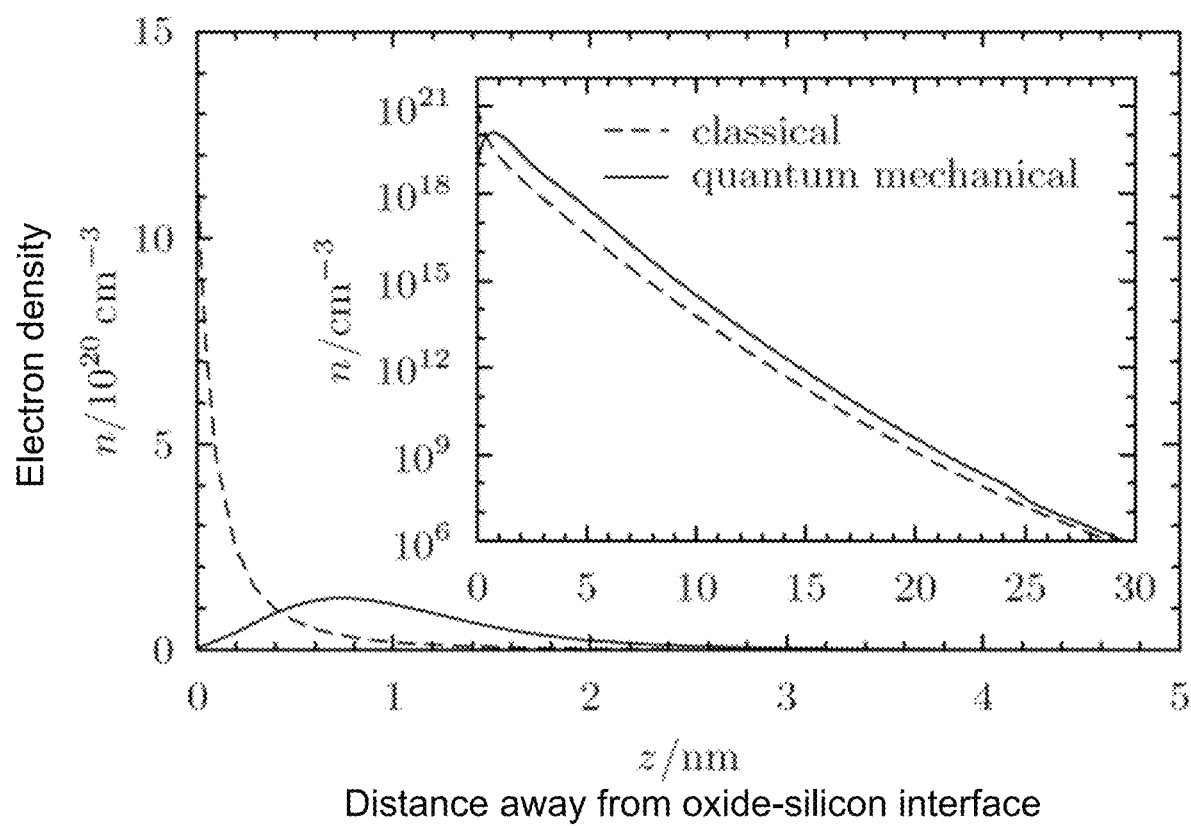
FIG. 6 is a plot of electron density in a MOS-structure.

FIG. 6 is a plot of electron density in a MOS-structure with 3 nanometer gate oxide thickness, $5 \cdot 10^{17}$ cm$^{-3}$ boron doped channel, and <100> substrate orientation, at a gate voltage of 3 Volts. As shown in FIG. 6, quantum mechanically, the centroid of the electron density is close to 1 nm away from the oxide-silicon interface. That is, the quantum separation distance is close to 1 nm in this example. Because the majority of electrons are located away from the oxide-silicon interface, a measured value of the oxide thickness (e.g., as measured by capacitance-voltage measurement methods) is larger than the classical case in which electron density is assumed to peak at the oxide-silicon interface. Also, because of quantum separation, the threshold voltage is higher than the classical case when the electron density peaks at the oxide-silicon interface. Quantum separation in silicon is discussed in more detail in Andreas Wettstein, *Quantum Effects in MOS Devices*, Ph.D. Thesis, April 2000, Department of Information Technology and Electrical Engineering, Eidgenossische Technische Hochschule (ETH) Zurich, which is herein incorporated by reference in its entirety.

Figure 7:
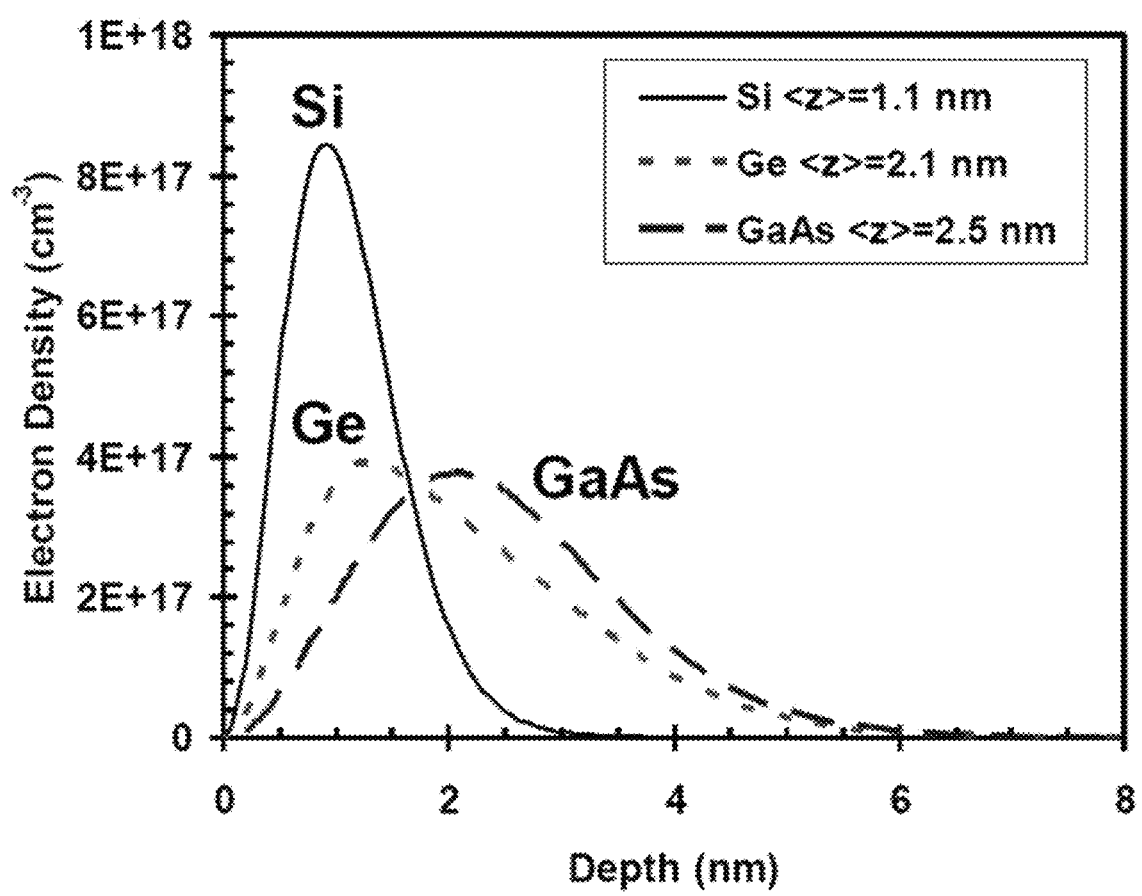
FIG. 7 illustrates examples of quantum separation.

FIG. 7 illustrates more examples of quantum separation. FIG. 7 shows a comparison among silicon (Si), germanium (Ge), and gallium arsenide (GaAs) in electron density away from an oxide-semiconductor interface of a MOS transistor in the inversion mode. As shown in FIG. 7, a majority of electrons are located away from the oxide-semiconductor interface. FIG. 7 shows that the quantum separation distance is about 1.1 nanometers in silicon, 2.1 nanometers in Germanium, and 2.5 nanometers in gallium arsenide.

To account for the effect of quantum separation, it is advantageous to choose the node spacing in the grid to be smaller than the quantum separation distance in the particular semiconductor material. Otherwise electron density and related characteristics of the structure may not be calculated accurately. For example, a grid with an adjacent node spacing greater than the quantum separation distance may yield an incorrect distance to the electron density centroid in a MOS transistor in the inversion mode. Since the semiconductor so often of interest is silicon, preferably the node spacing in the grid is chosen to be smaller than the quantum separation distance in silicon.

More preferably, the equal distance d (in the x, y, or z direction) between each pair of adjacent nodes of the grid illustrated in FIGS. 2 and 4 preferably is substantially the same as the atomic size of silicon, or 0.27 nanometers. That is, the grid is of atomic scale. Table 1 below lists atomic sizes and densities of atoms commonly found in semiconductor structures. In Table 1, the atomic size is calculated as the inverse cube root of the density. That is, the atomic size is the side of a cubic volume that on average an atom occupies in space. The atomic size describes an average distance between a pair of adjacent atoms. As shown in Table 1, atomic sizes of these atoms and molecules are different but within ±10% of 0.27 nanometers (the atomic size of silicon). Thus a grid with nodes equally spaced (in the x, y, and z direction) at a spacing which is within ±10% of 0.27 nanometers (the atomic size of silicon) can be used to represent a semiconductor structure with various atomic compositions having different atomic sizes. The distance 0.27 nanometers is also significantly less than the quantum separation distance in any of these materials, and therefore will not cause the inaccuracies that can arise for grids with node distances larger than the quantum separation distance.

TABLE 1

| Material | Si | Ge | GaAs | SiO$_2$ | Si$_3$N$_4$ | W | MoS$_2$ |
|---|---|---|---|---|---|---|---|
| Density (atoms/cm3) | 5e22 | 4.4e22 | 4.4e22 | 6e22 | 7e22 | 6e22 | 6e22 |
| Atomic Size (nm) | 0.271 | 0.283 | 0.283 | 0.255 | 0.243 | 0.255 | 0.255 |
| Difference with Si | 0 | +4% | +4% | −6% | −10% | −6% | −6% |

Note that nodes in the grid illustrated in FIGS. 2 and 4 are arranged differently from the crystal structures of the atoms and molecules commonly found in semiconductor structures. For example, in a $SiO_2$ crystal structure, an angle between two different silicon atoms connected to the same oxygen atom can be 144°. In the grid illustrated in FIGS. 2 and 4, the angle between adjacent nodes is always 90° or 180°. Although the distance between adjacent nodes in the grid is similar to the distance between adjacent atoms in the body being modeled, there is no requirement that the exact position of the nodes in the grid correspond to those atoms in the structure.

The grid described above with nodes equally spaced at a distance less than the quantum separation distance in silicon can be used for solving partial differential equations describing behavior of one or more quantities in a structure, such as the nano wire transistor illustrated in FIG. 3. For example, the partial differential equation can be a continuity equation that describes a conserved quantity (e.g., charged carriers, atoms, mass, energy, momentum) in the nano wire structure. The grid is imposed on a body, which may be only a portion of the nano wire structure (e.g., as illustrated in FIG. 4). The partial differential equation is then solved iteratively and values are determined at each node in the grid for quantities modeled by the partial differential equation (e.g., electron density, electron flux).

Figure 8:
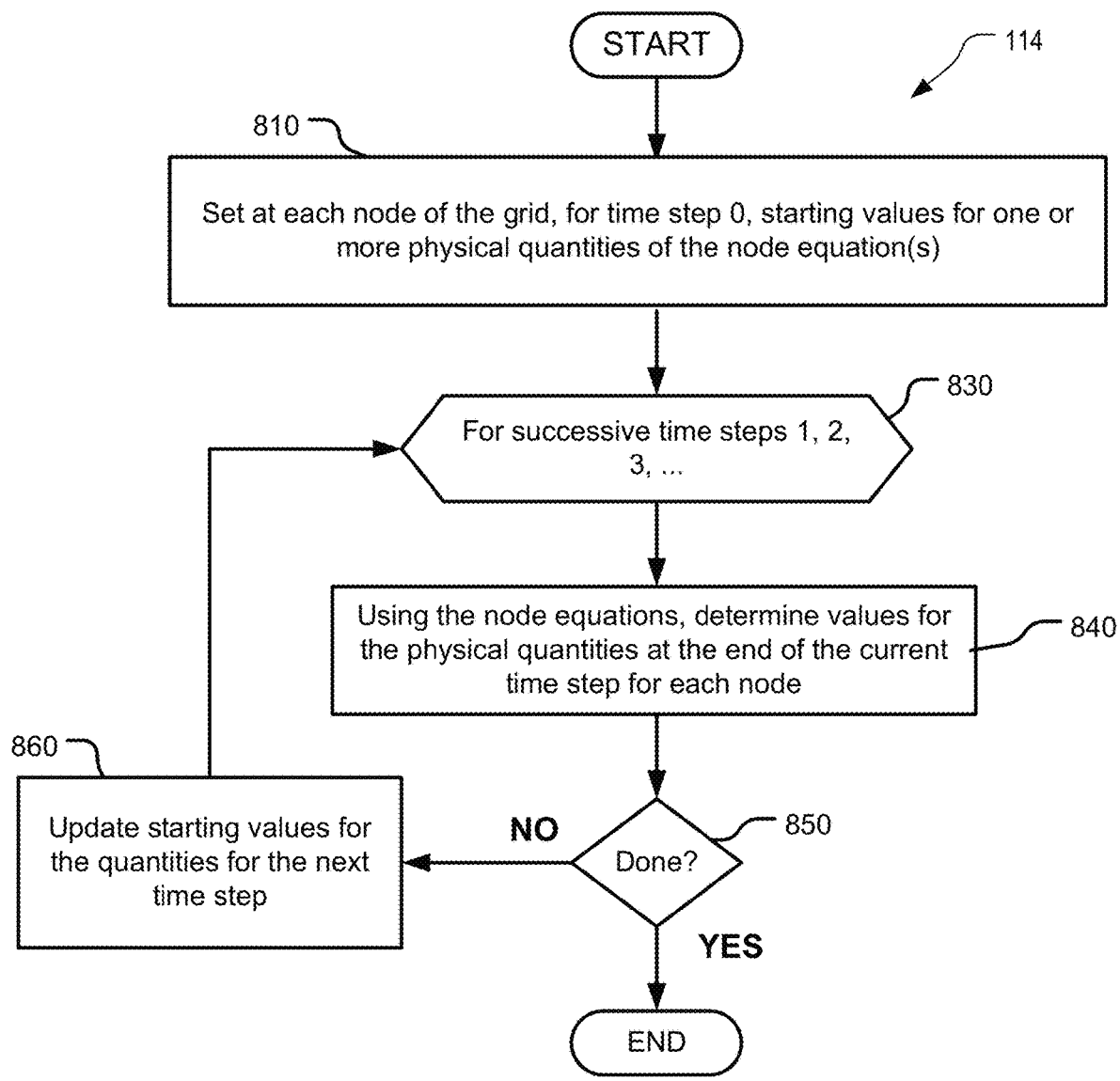
FIG. 8 is a flow chart detail of the step in FIG. 1 for iteratively determining values for physical quantities of the body at the end of a plurality of time steps in a CAD system.

FIG. 8 is a flow chart detail of logic in step 114 (FIG. 1) for iteratively determining values for the physical quantities of the body at the end of a plurality of time steps in a CAD system. The logic of FIG. 8 be implemented using processors programmed using computer programs stored in memory accessible to the computer systems and executable by the processors, by dedicated logic hardware, including field programmable integrated circuits, or by combinations of dedicated logic hardware and computer programs. Each block in the flowchart may represent in various embodiments a module, segment, or portion of code, which comprises one or more executable instructions (which may or may not be contiguous) for implementing the specified logical function(s). As with all flowcharts herein, it will be appreciated that many of the steps can be combined, performed in parallel or performed in a different sequence without affecting the functions achieved. In some cases, as the reader will appreciate, a re-arrangement of steps will achieve the same results only if certain other changes are made as well. In other cases, as the reader will appreciate, a re-arrangement of steps will achieve the same results only if certain conditions are satisfied. Furthermore, it will be appreciated that the flow charts herein show only steps that are pertinent to an understanding of the invention, and it will be understood that in a specific embodiment, numerous additional steps for accomplishing other functions for that embodiment can be performed before, after and between those steps shown.

Each step illustrated in the flow chart describes logic that can be implemented in hardware or in software running on one or more computing processes executing on one or more computer systems. Since most simulations of this type are extremely compute intensive, usually requiring hours to perform on advanced computer hardware, at least some of the illustrated steps cannot reasonably be performed in the human mind. In one embodiment, each step of the flow chart illustrates the function of a separate module of software. In another embodiment, the logic of the step is performed by software code routines which are distributed throughout more than one module.

In accordance with FIG. 1, prior to step 810, a grid of nodes already has been imposed on the body to be modeled, including assignment of property values. The grid (e.g., as illustrated in FIG. 2) comprises nodes that are placed in linear and independent directions at a uniform distance that is less than the quantum separation distance in silicon.

The node equations also have already been determined and, in some embodiments, boundary conditions are established at certain nodes. For example, the method can assign values of zero fluxes at nodes at the boundaries of the grid (e.g., as for a reflective boundary condition).

In step 810, the method sets, at each node of the grid, for time step 0, starting values for one or more physical quantities of the node equation(s). For example, the method can set starting values of electron density at each node of the grid. Typically the starting values can be either zero or certain equilibrium values that can be easily calculated.

For each successive time step 1, 2, 3, and so on (Step 830), the method uses the node equations to calculate values for the physical quantities at the end of the current time step for each node (step 840). For example, if the node equations form a system of simultaneous equations (a finite set of equations in the same unknowns, of which the common solutions are to be determined), then the system can be solved using any of a number of well-known methods for solving such a system of equations "as simultaneous equations." For example, the system of node equations can be transformed into a matrix system, in which an off-diagonal element in the matrix system represents interactions (e.g., flux) between a pair of adjacent nodes in the grid. The matrix system at the current time step then can be solved iteratively by a suitable numerical method such as the Gauss-Seidel method or Newton's method. Newton's Method, as well as some advantageous modifications thereof, are described, for example, in U.S. Pat. No. 7,302,375, by inventors Kucherov and Moroz, incorporated by reference herein. The method also records values of the quantities after the matrix system is solved for the current time step.

Similarly, if the node equations are probability equations describing the probability of a particular event occurring at each node during the time step, then random numbers can be generated and applied to the node equations to determine whether and/or to what extent the event will be considered to have occurred at that node during the current time step.

At Step 850, the method determines whether the solution at the current time step is satisfactory. For example, the method can determine whether the solution has converged within a specified threshold. If the solution is satisfactory at the current time step, the method of FIG. 8 ends. In addition, the method can report to a user via a user interface the final state of the body (e.g., values of the quantities of interest at the grid nodes). The report can take the form of numeric values, for example, or a visualization such as those shown in FIG. 3, 5, 9A or 9B.

If the solution at the current time step is not satisfactory, the method updates starting values of the quantities for the next time step (Step 860). For example, the method can update starting values of the quantities for the next time step using the values determined for the quantities at the current time step. Then the method repeats the loop of Steps 830, 840, 850, and 860, until a convergence condition is reached. Alternatively or additionally, the method can terminate the loop of Step 830, 840, 850, and 860 after the iteration has been carried out for a specified number of time steps as indicated in the time step parameters (FIG. 12).

Figure 9A:
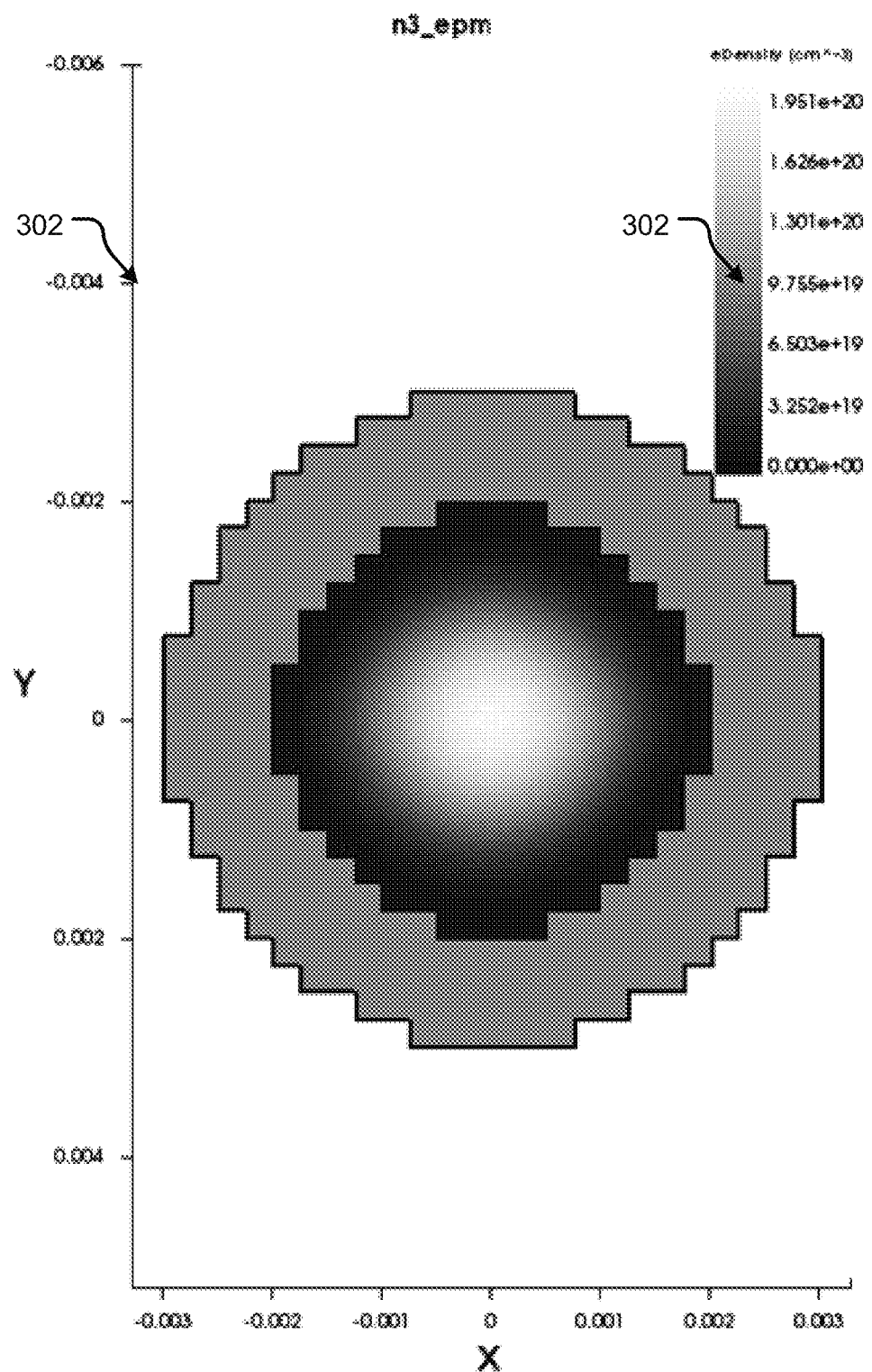
FIG. 9A is a visualization illustrating values of electron density in a cylindrical silicon region of a nano wire as calculated by solving a continuity equation using a uniform tensor product grid of equally-spaces nodes.

FIG. 9A is a visualization illustrating values of electron density in the cylindrical silicon region 301 of the nano wire of FIG. 3 as calculated by solving Schrodinger's equation using the uniform tensor product grid of equally-spaced nodes described above. As shown in FIG. 9A, the electron density is substantially zero near the oxide-silicon interface.

Figure 9B:
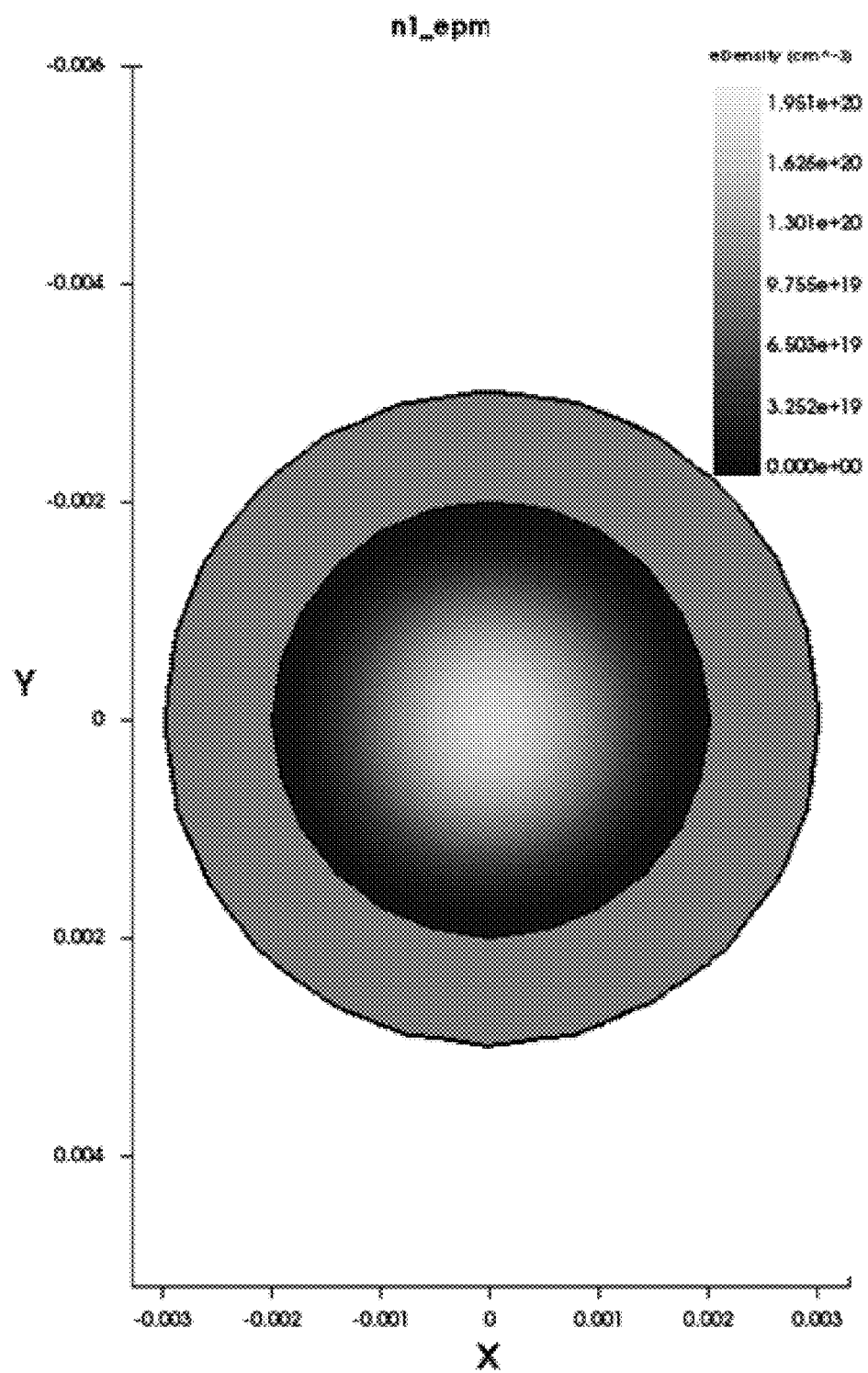
FIG. 9B is a visualization illustrating values of electron density in a cylindrical silicon region of a nano wire as calculated by solving a continuity equation using a non-uniform grid with tetrahedral grid elements.

FIG. 9B illustrates values of electron density in the cylindrical silicon region 301 of the nano wire of FIG. 3 as calculated by solving Schrodinger's equation using a non-uniform grid with a tetrahedral grid of nodes. FIG. 9B shows quantitatively similar results as FIG. 9A. FIG. 9B has finer resolution, but because of the non-uniform grid that leads to irregular sparse matrix, computation of electron density values in FIG. 9B would require far more computing time than computation of electron density values in FIG. 9A with the uniform tensor product grid.

KMC Embodiments

The above-described techniques can be used for simulating a variety of different phenomena, modeled with a variety of different types of node equations. Processes involving particle movement or chemical reactions, for example, often are best modeled using discrete time probability equations. The KMC method is a Monte Carlo computer simulation method that simulates time evolution of certain processes occurring at a known rate, modeled by such discrete time probability equations. See A. F. Voter, Introduction to the Kinetic Monte Carlo Method, in Radiation Effects in Solids, edited by K. E. Sickafus, E. A. Kotomin and B. P. Uberuaga (Springer, NATO Publishing Unit, Dordrecht, The Netherlands, 2007) pp. 1-23, incorporated by reference herein.

In a KMC method, events are modeled as having a predefined probability of occurring per unit time. For modeling a dopant diffusion process, for example, there is a known probability at which a dopant atom will jump in each direction during a particular time step. The probability increases with increasing temperature. The probability per time step, which can also be thought of as a frequency of occurrence f, is given by:

$$f = A \cdot \exp\left(\frac{-E_a}{kT}\right),$$

where
- A is a pre-factor that is determined by the properties of a material where the event is occurring and the properties of the particle under consideration;
- $E_a$ is an activation energy of the event, such as the energy barrier for the particle jumping from one location to the next;
- k is Boltzmann's constant, and
- T is temperature Thus to model a process in which events occur randomly, with a frequency that depends on the values of certain properties of the particle of interest and properties of the local material, an embodiment might use discrete time probability equations as the node equations, rather than discrete time continuity equations. The node equations apply at each grid node, and the parameters of the node equation (A, $E_a$ and T in the above example) are assigned values based on the material and conditions extant at each grid node. The time step for the simulation is typically chosen based on the time scale at which the event is likely to occur. If multiple concurrent random processes are to be modeled, then the time step for the simulation is typically chosen based on the time scale at which the most frequent event is likely to occur.

In the past, KMC methods have typically not involved an imposed grid of nodes in the sense described herein. Rather, particles were assigned their actual (simulated) positions within the body. For example, simulations of dopant diffusion through a base material typically assumed that dopant particles would jump from one position to another in the base material, neither of which positions are necessarily related to the positions of any imposed grid of nodes. Often the probability of the event would depend on the Euclidean distance to an adjacent particle, which can be time consuming to calculate.

According to an aspect of the present invention, on the other hand, a uniform grid of nodes is imposed on the body, with atomic scale node spacing as set forth above. The node equations are discrete time probability equations, but in most cases the calculations are simplified by assuming that all particles lie at grid nodes. Thus in most cases the distance between particles is simply the uniform, predetermined node spacing. It can be seen that the imposition of an atomic scale uniform grid can greatly speed the determination of physical quantities at the end of each time step for each node (step 840).

The simplification that all particles lie at grid nodes can yield high accuracy for most regions of the body being modeled. The simplification may not be as valid, however, at or near material boundaries. Therefore, in an aspect of the invention, the grid node data structure also identifies the actual position of the particle assigned to each grid node. For most purposes the grid node position is used in the calculations. But for grid nodes that lie within a predetermined neighborhood near a boundary, the actual positions of the particles are used to calculate the distance between particles. For example, if the node equations depend on the distances to only the immediately adjacent particles, iterating module 1212 can determine that a particular grid node is within the predetermined neighborhood of a boundary by detecting that the particle type assigned to any immediately adjacent grid node differs from the particle type assigned to the particular grid node. Similarly, if the node equations depend on the distances to the adjacent particles and also to the particles located one node beyond the adjacent particles, then iterating module 1212 can determine that a particular grid node is within the predetermined neighborhood of a boundary by detecting that any grid node lying within two nodes of the particular grid node is assigned a particle type which differs from the particle type assigned to the particular grid node. Thus as used herein, the term "boundary neighborhood" is co-extensive with the reach of the relevant node equations. Note that a particular embodiment might use actual particle positions rather than grid node positions even for certain grid nodes outside the boundary neighborhood, though such an embodiment might sacrifice some speed without significant improvement in accuracy.

For certain kinds of KMC-modeled processes, one is interested only in the movement of a subset of the particle types. For example, when modeling an impurity diffusion processes, usually the user is interested only in the movement of impurity particles, and not the movement of particles of the base material. This kind of simulation can be streamlined by evaluating node equations only where the particular particles of interest are likely to occur. So in the impurity diffusion example, if the impurity concentration in a particular region is only 1%, then node equations for only 1% of the grid nodes need be evaluated. In various embodiment, this subset of grid nodes can be selected randomly or can be selected to be distributed uniformly throughout the region, or with an appropriate gradient. The selected subset of grid nodes are given node equations describing the probability that the impurity particle will jump from one grid node in the subset to another. No node equations need be applied to the other 99% of the grid nodes because those equations are not evaluated. Alternatively, if the node equations at all grid nodes will be evaluated, those grid nodes not in the selected subset can be assigned node equations that evaluate to zero. Other ways of disregarding the effect of node equations at grid nodes not in the selected subset, or reducing the computational effort for such node equations, will be apparent to the reader.

Modeling Multiple Phenomena with Interrelated Sub-Systems of Node Equations

KMC can be used to model more than one probabilistic phenomenon in play in the same body. For example, while the above equation can be used to model particle jumping probabilities, another equation can be used to model the likelihood that two adjacent particles will react to form a different particle type. In an embodiment modeling multiple mutually interrelated probabilistic phenomena in play concurrently in the same body, the system of node equations can be provided as multiple sub-systems of node equations. These multiple sub-systems of node equations can be resolved in sequential round-robin fashion within each time step (i.e. within a single instance of step 840). More particularly, if there are three subsystems of node equations, then step 840 can involve first determining values for the physical quantities at the end of the current time step for each node using only the first subsystem of node equations, based on values existing as a result of the prior complete time step; then determining values for the physical quantities at the end of the current time step for each node using only the second subsystem of node equations, based on values existing as a result of the first sub-system of node equations; and then determining values for the physical quantities at the end of the current time step for each node using only the third subsystem of node equations, based on values existing as a result of the second sub-system of node equations. It is a simplification to assume that the values determined as a result of the first and/or second sub-systems of node equations are accurate starting values for the second and/or third sub-system of node equations, but the simplification can be valid with sufficiently short time steps.

In addition, the use of an atomic scale uniform grid can also greatly simplify the simulation of a process involving multiple mutually interrelated phenomena in play concurrently in the same body, each modeled using different types of node equations. In particular, one phenomenon can be modeled as a set of discrete time continuity equations, for which the node equations are partial differential equations, while another phenomenon is modeled as a random process, for which the node equations are discrete time probability equations.

As an example of a simulation problem involving two interrelated phenomena modeled by these two different types of equations, consider random particle drift of charged particles arising due to an electric field. If the particles were neutral, or if they were charged but there was no electric field, then what results is diffusion. The jumping frequency is isotropic and as set forth above, its frequency f is given by:

$$f = A \cdot \exp\left(\frac{-E_a}{kT}\right).$$

If the particles are charged and there is an electric field, then in addition to random diffusion there is also a drift driven by the field. The jumping frequency is no longer isotropic, and is given by:

$$f = A \cdot \exp\left(\frac{-E_a + \Delta E}{kT}\right),$$

where $\Delta E$ is the change to the diffusion barrier due to the field:

$$\Delta E = \pm E \cdot \lambda,$$

where $\lambda$ is the particle jumping distance (which, as previously described, can be simplified to be equal to the uniform spacing between grid nodes, except in the neighborhood of material boundaries where the actual distances may be used). In a given dimension of the grid, $\Delta E$ is positive for one direction and negative for the opposite direction, thereby rendering the likelihood of a jump in one direction to be greater than the likelihood of a jump in the opposite direction. The non-isotropic jumping frequency is what gives rise to drift.

But the positions of the charged particles affect the electric field in the body. Poisson's Equation can be used to obtain electric field E and electrostatic potential $\varphi$ from charge distribution q:

$$\nabla^2 \varphi = q,$$

where $\nabla^2$ is the double differentiation over x, y and z. The electric field E is a derivative of the electrostatic potential $\varphi$:

$$E = \nabla \varphi.$$

The electric field at each grid node is best calculated by solving a system of partial differential equations. Thus the simulation problem involves two interrelated phenomena, one modeled as a system of partial differential equations, while the other is modeled as a random process best described by a system of discrete time probability equations.

Figure 13:
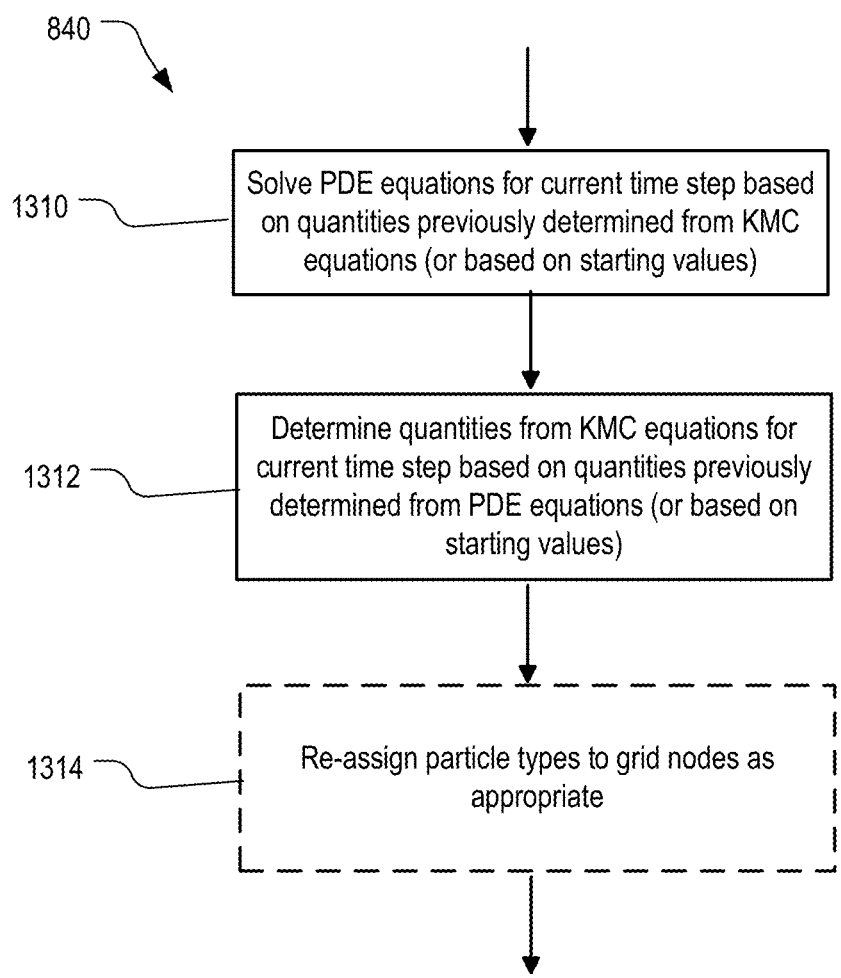
FIG. 13 is a flow chart detail of the step 840 in FIG. 8, in which two different types of interrelated node equations are used.

FIG. 13 is a flow chart detail of step 840 (FIG. 8), in which these two types of interrelated node equations are used. In step 1310, in the first time step of the simulation, the sub-system of partial differential equations describing the electric field is solved as a set of simultaneous equations based on starting values. In step 1312, quantities from the sub-system of discrete time probability equations modeling particle diffusion and drift are determined for the current time step using a KMC method, based on quantities previously determined by solving the sub-system of partial differential equations in step 1310. Any required re-assignment of particle types to particular nodes as described above can be performed as part of step 860 for the next iteration of step 840. In the second and subsequent time steps, in step 1310, the sub-system of partial differential equations is again solved as a set of simultaneous equations based on quantities determined in the immediately preceding iteration of step 1312. In step 1312, quantities from the sub-system of discrete time probability equations modeling particle diffusion and drift are again determined using the KMC method, based on quantities previously determined by the immediately preceding iteration of step 1310, and so on. This type of multiple equation-type simulation can be difficult to perform without an atomic scale uniform grid imposed on the body and used for both types of equations. Note that in a variation of the embodiment of FIG. 13, the two steps 1310 and 1312 can be interchanged. Also, note that if a moving boundary is involved in the simulation, then a step 1314

(shown in broken lines in FIG. 13) can follow the KMC step 1312. In step 1314, the moving boundary is accommodated merely by re-assigning particle types to the fixed grid nodes as appropriate, based on the changes in relevant quantities determined by the KMC step 1312 in the current time step.

As described above, the determination of quantities from different sub-systems of equations is considered to occur during separate, sequential time sub-steps of each full time step. This can be thought of as involving two pluralities of time sub-steps interspersed with each other. In a variation, some or all of the time sub-steps may be pipelined or performed in parallel. Note that it is the time sub-steps represented by each calculation which are considered sequential, not the time periods during which the calculations are actually performed. Additionally, if the time sub-steps are considered divided into two or more pluralities of time sub-steps, though it is preferred that they be interspersed one-to-one (or round-robin if there are more than two), that is not absolutely essential. In one embodiment, the two or more pluralities of time steps are asynchronous with each other. Each node equation is a function of the most recent values obtained from the other sub-system(s) of node equations, even if some of the values were determined more than one integer time step previously.

In yet another embodiment, the determination of quantities in a single time step from different sub-systems of equations can occur independently of each other. In such an embodiment all the sub-systems of equations can be evaluated based on values calculated for the end of the prior full time step. In this embodiment the different sub-systems of equations can be evaluated in parallel on different hardware, and there would be no need to keep track of time sub-steps or intermediate results. Again, though it is a simplification to assume that the values calculated for the end of the prior full time step are accurate starting values for all of the sub-systems of node equations, the simplification can be valid with sufficiently short time steps.

Further, it is preferable that different sub-systems of node equations used conjunctively to model a process all use the same grid of nodes. However, in a variation, different sub-systems of node equations could use different grids, though it would be preferable if all nodes of one grid coincide with nodes of the other grid in order to avoid sacrificing benefits of the uniform grid. For example, one sub-system of equations might include one node equation for each node of its grid, whereas another sub-system of node equations might have only one node equation for every second node in each dimension of the first system's grid (i.e. ⅛ the number of node equations). Other variations will be apparent.

Computer System

Figure 10:
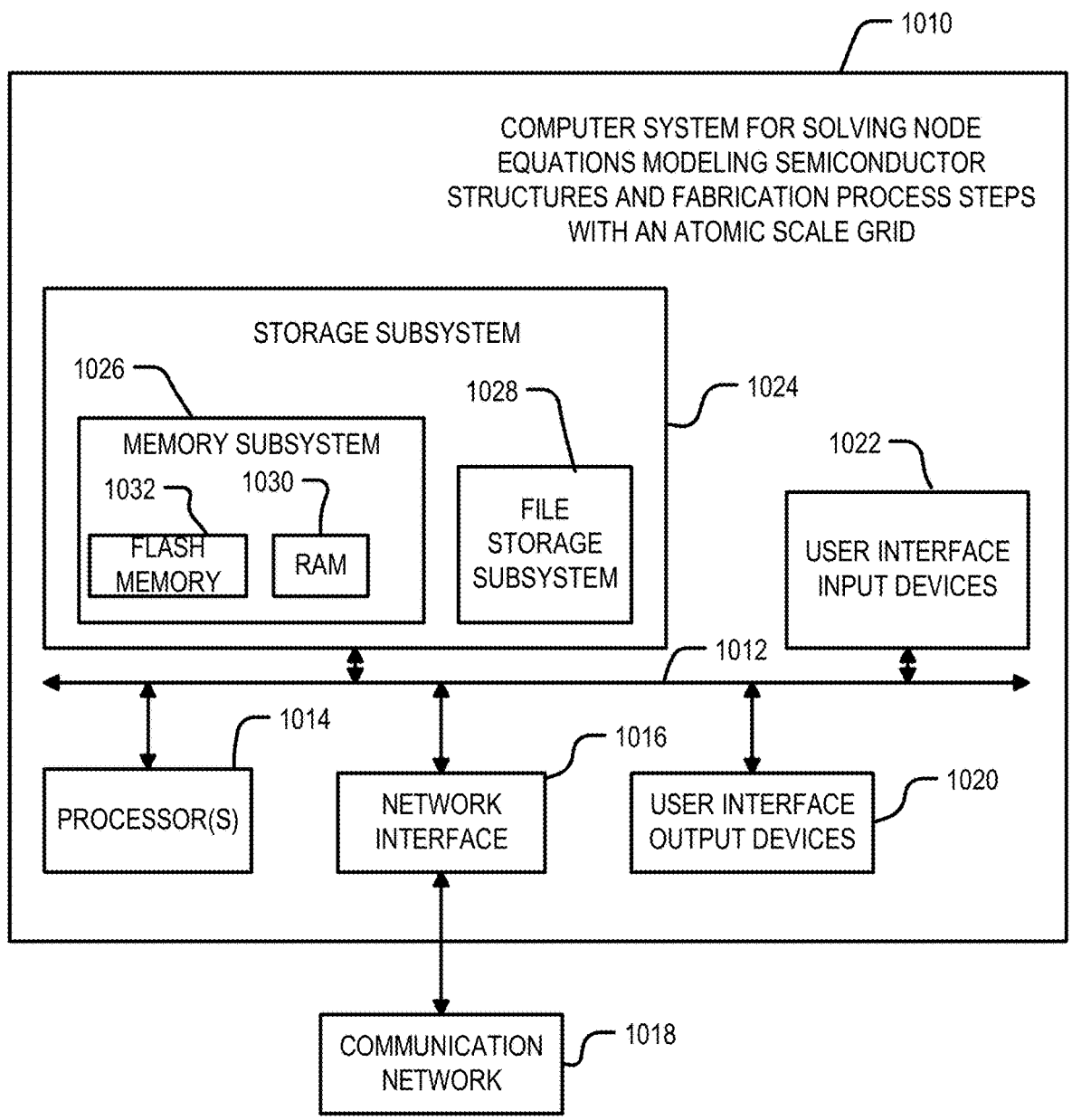
FIG. 10 is a simplified block diagram of a computer system.

FIG. 10 is a simplified block diagram of a computer system 1010 suitable for use with embodiments of the technology. For example, meshing module 1210 and iterating module 1212 may be implemented using computer systems 1010. Computer system 1010 typically includes at least one processor 1014 which communicates with a number of peripheral devices via bus subsystem 1012. These peripheral devices may include a storage subsystem 1024, comprising a memory subsystem 1026 and a file storage subsystem 1028, user interface input devices 1022, user interface output devices 1020, and a network interface subsystem 1016. The input and output devices allow user interaction with computer system 1010. Network interface subsystem 1016 provides an interface to outside networks, including an interface to communication network 1018, and is coupled via communication network 1018 to corresponding interface devices in other computer systems. Communication network 1018 may comprise many interconnected computer systems and communication links. These communication links may be wireline links, optical links, wireless links, or any other mechanisms for communication of information. While in one embodiment, communication network 1018 is the Internet, communication network 1018 may be any suitable computer network.

User interface input devices 1022 may include a keyboard, pointing devices such as a mouse, trackball, touchpad, or graphics tablet, a scanner, a touchscreen incorporated into the display, audio input devices such as voice recognition systems, microphones, and other types of input devices. In general, use of the term "input device" is intended to include all possible types of devices and ways to input information into computer system 1010 or onto communication network 1018.

User interface output devices 1020 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image such as those of FIGS. 6, 7, 9A, and 9B. The display subsystem may also provide non-visual display such as via audio output devices. In general, use of the term "output device" is intended to include all possible types of devices and ways to output information from computer system 1010 to the user or to another machine or computer system. Visualizations of quantities determined by the techniques herein may be presented on some of these output devices.

Storage subsystem 1024 stores the basic programming and data constructs that provide the functionality of some or all of the embodiments described herein, including the methods for solving a partial differential equation in modeling semiconductor structures and fabrication process steps with an atomic-scale grid. These software modules are generally executed by processor 1014, to implement the logic of the methods described herein.

Memory subsystem 1026 typically includes a number of memories including a main random access memory (RAM) 1030 for storage of instructions and data during program execution and a read only memory (ROM) 1032 in which fixed instructions are stored. File storage subsystem 1028 provides persistent storage for program and data files, and may include a hard disk drive, a floppy disk drive along with associated removable media, a CD-ROM drive, an optical drive, or removable media cartridges. The databases and modules implementing the functionality of certain embodiments may be stored by file storage subsystem 1028.

Bus subsystem 1012 provides a mechanism for letting the various components and subsystems of computer system 1010 communicate with each other as intended. Although bus subsystem 1012 is shown schematically as a single bus, alternative embodiments of the bus subsystem may use multiple busses.

Computer system 1010 itself can be of varying types including a personal computer, a portable computer, a workstation, a computer terminal, a network computer, a television, a mainframe, or any other data processing system or user device. Due to the ever-changing nature of computers and networks, the description of computer system 1010 depicted in FIG. 10 is intended only as a specific example for purposes of illustrating the preferred embodiments. Many other configurations of computer system 1010 are possible having more or less components than the computer system depicted in FIG. 10.

As used herein, a given event or value is "responsive" to a predecessor event or value if the predecessor event or value influenced the given event or value, or if it is a function of the predecessor event or value. If there is an intervening processing element, step or time period, the given event or value can still be "responsive" to the predecessor event or value. If the intervening processing element or step combines more than one event or value, the signal output of the processing element or step is considered "responsive" to each of the event or value inputs. If the given event or value is the same as the predecessor event or value, this is merely a degenerate case in which the given event or value is still considered to be "responsive" to the predecessor event or value. "Dependency" of a given event or value upon another event or value is defined similarly.

As used herein, the "identification" of an item of information does not necessarily require the direct specification of that item of information. Information can be "identified" in a field by simply referring to the actual information through one or more layers of indirection, or by identifying one or more items of different information which are together sufficient to determine the actual item of information. In addition, the term "indicate" is used herein to mean the same as "identify".

The applicant hereby discloses in isolation each individual feature described herein and any combination of two or more such features, to the extent that such features or combinations are capable of being carried out based on the present specification as a whole in light of the common general knowledge of a person skilled in the art, irrespective of whether such features or combinations of features solve any problems disclosed herein, and without limitation to the scope of the claims. The applicant indicates that aspects of the present invention may consist of any such feature or combination of features. In view of the foregoing description it will be evident to a person skilled in the art that various modifications may be made within the scope of the invention.

The foregoing description of preferred embodiments of the present invention has been provided for the purposes of illustration and description. It is not intended to be exhaustive or to limit the invention to the precise forms disclosed. Obviously, many modifications and variations will be apparent to practitioners skilled in this art. For example, while constant duration time steps are useful in some embodiments, other embodiments might use time steps which vary during the course of a simulation. In particular, and without limitation, any and all variations described, suggested or incorporated by reference in the Background section of this patent application are specifically incorporated by reference into the description herein of embodiments of the invention. In addition, any and all variations described, suggested or incorporated by reference herein with respect to any one embodiment are also to be considered taught with respect to all other embodiments. The embodiments described herein were chosen and described in order to best explain the principles of the invention and its practical application, thereby enabling others skilled in the art to understand the invention for various embodiments and with various modifications as are suited to the particular use contemplated. It is intended that the scope of the invention be defined by the following claims and their equivalents.

The invention claimed is:

1. A non-transitory computer readable medium having stored thereon a plurality of software code portions defining logic for simulating a temporal process in a body, the logic comprising:

providing a first system of node equations, including a first node equation for each of a first plurality of nodes of a uniform grid of nodes imposed on the body, the grid having three independent dimensions and having a uniform node spacing which is within ±10% of 0.27 nanometers, the first node equation for each particular one of the first nodes indicating a field value at the particular node in dependence upon quantities of a moveable particle within a first predetermined neighborhood around the particular node;

providing a second system of node equations, including a second node equation for each of a second plurality of nodes in the grid, the second node equation for each subject one of the second nodes indicating a flux of the moveable particles at the subject node in dependence upon the field values within a second predetermined neighborhood around the subject node, the second plurality of nodes including all of the first plurality of nodes or the first plurality of nodes including all of the second plurality of nodes or both;

iterating through a plurality of the time steps to approximate quantities of the moveable particle at each of the nodes in the second plurality of nodes at the end of the plurality of time steps, and at each given time step in the plurality of time steps:

approximating a field distribution for the given time step at each of the second plurality of nodes in dependence upon the first node equations and in further dependence upon a distribution of the moveable particles immediately prior to the given time step, and approximating a distribution of the moveable particles for the given time step in dependence upon the second node equations and in further dependence upon the field distribution approximated for the given time step.

2. The computer readable medium of claim 1, wherein the moveable particles are charged particles, and wherein the field values are electric field values.

3. The computer readable medium of claim 1, wherein the three independent dimensions are mutually orthogonal.

4. The computer readable medium of claim 1, wherein approximating a field distribution for the given time step at each of the second plurality of nodes in dependence upon the first node equations comprises solving the first system of node equations as a set of simultaneous equations.

5. The computer readable medium of claim 1, wherein the second system of node equations includes a system of discrete time probability equations, and wherein approximating a distribution of the moveable particles for the given time step comprises determining a particle quantity change at each of the nodes in the second plurality of nodes randomly in dependence upon the probability equation for that node.

6. The computer readable medium of claim 1, wherein the second system of node equations includes a system of discrete time continuity equations, at least one of the discrete time continuity equations for each node in the second plurality of nodes, and wherein approximating a distribution of the moveable particles for the given time step comprises solving the system of continuity equations as a set of simultaneous equations.

7. The computer readable medium of claim 1, wherein the first node equations for each particular one of the first nodes indicates the field value at the particular node in dependence upon quantities of the moveable particle within the first predetermined neighborhood assigned to nodes around the particular node, and wherein the first predetermined neighborhood around the particular node consists of the particular node and all nodes in the first plurality of nodes which in the grid are immediately adjacent to the particular node.

8. The computer readable medium of claim 1, wherein the second node equation for each subject one of the second nodes indicates the flux of the moveable particles at the subject node in dependence upon the field values assigned to nodes within the second predetermined neighborhood around the subject node, and wherein the second predetermined neighborhood around the subject node consists of the subject node and all nodes in the second plurality of nodes which in the grid are immediately adjacent to the subject node.

9. The computer readable medium of claim 1, wherein the first and second pluralities of nodes are the same.

10. The computer readable medium of claim 1, wherein the moveable particles are disposed in the body in a crystal lattice structure whose vertex positions differ from the node positions in the uniform grid, wherein the logic comprises assigning each of the moveable particles to a corresponding node of the second plurality of nodes, wherein each of the first node equations indicates the field value at the particular node in dependence upon quantities of the moveable particle assigned to nodes in the second plurality of nodes which are within the first predetermined neighborhood of the particular node, and wherein approximating a field distribution for the given time step at each of the second plurality of nodes comprises evaluating the first node equations at the particular node in dependence upon the quantity of the moveable particle assigned to each node in the second plurality of nodes which are within the first predetermined neighborhood of the particular node, and further in dependence upon the distance to that node from the particular node.

11. The computer readable medium of claim 1, wherein the moveable particles are disposed in the body in a crystal lattice structure whose vertex positions differ from the node positions in the uniform grid, wherein the logic comprises assigning each of the moveable particles to a corresponding node of the second plurality of nodes, and storing, in association with each node to which a particle is assigned, an identification of an actual position in the body of the particle assigned to the node, wherein each of the first node equations indicates the field value at the particular node further in dependence upon a distance to each of the moveable particles which are within the first predetermined neighborhood of the particular node, and wherein approximating a field distribution for the given time step at each of the second plurality of nodes comprises:

determining, for each particular one of the nodes in the first plurality of nodes, whether the first predetermined neighborhood around the particular node includes a material border in the body;

if the first predetermined neighborhood does include a material border, then for a particular one of the moveable particles within the first predetermined neighborhood, evaluating the first node equations at the particular node in dependence upon the actual distance to the particular particle as indicated by the actual position of the particle as stored in association with the node to which the particle is assigned; and if the first predetermined neighborhood does not include a material border, then evaluating the first node equations at the particular node in dependence upon the quantity of the moveable particle assigned to each node in the second plurality of nodes which are within the first predetermined neighborhood of the particular node, and further in dependence upon the distance to that node from the particular node.

12. The computer readable medium of claim 1, wherein the moveable particles are disposed in the body in a crystal lattice structure whose vertex positions differ from the node positions in the uniform grid, wherein approximating a field distribution comprises assigning field values to nodes of the first plurality of nodes, wherein each of the second node equations indicates the flux of the moveable particles at the subject node in dependence upon the field values assigned to nodes within the second predetermined neighborhood around the subject node, and wherein approximating a distribution of the moveable particles for the given time step comprises evaluating the second node equations at the subject node in dependence upon the field value assigned to each node in the first plurality of nodes which are within the second predetermined neighborhood of the subject node, and further in dependence upon the distance to that node from the subject node.

13. The computer readable medium of claim 1, wherein the code portions further define logic for reporting to a user values determined for the distribution of the moveable particles at the end of the plurality of time steps.

14. A computer-implemented method for simulating a temporal process in a body, comprising:

providing a first system of node equations, including a first node equation for each of a first plurality of nodes of a uniform grid of nodes imposed on the body, the grid having three independent dimensions and having a uniform node spacing which is within ±10% of 0.27 nanometers, the first node equation for each particular one of the first nodes indicating a field value at the particular node in dependence upon quantities of a moveable particle within a first predetermined neighborhood around the particular node;

providing a second system of node equations, including a second node equation for each of a second plurality of nodes in the grid, the second node equation for each subject one of the second nodes indicating a flux of the moveable particles at the subject node in dependence upon the field values within a second predetermined neighborhood around the subject node, the second plurality of nodes including all of the first plurality of nodes or the first plurality of nodes including all of the second plurality of nodes or both;

a computer system iterating through a plurality of the time steps to approximate quantities of the moveable particle at each of the nodes in the second plurality of nodes at the end of the plurality of time steps, and at each given time step in the plurality of time steps:

a computer system approximating a field distribution for the given time step at each of the second plurality of nodes in dependence upon the first node equations and in further dependence upon a distribution of the moveable particles immediately prior to the given time step, and a computer system approximating a distribution of the moveable particles for the given time step in dependence upon the second node equations and in further dependence upon the field distribution approximated for the given time step.

15. A non-transitory computer readable medium having stored thereon a plurality of software code portions defining logic for simulating a temporal process in a body portion, the body portion including first particles of a first particle type, the logic comprising:

assigning each of the first particles in the body portion to a corresponding one of a plurality of nodes in a uniform grid of nodes imposed on the body portion, the grid having three independent dimensions and having a uniform node spacing which is within ±10% of 0.27 nanometers, the first particles being disposed in a crystal lattice structure having vertices which do not coincide with any nodes of the uniform grid;

providing a system of discrete time probability node equations, at least one of the node equations for each of the plurality of nodes of the grid to which a particle is assigned, each of the node equations describing probability of a predetermined physical event type occurring at the respective grid node during a predetermined time period, in dependence upon a material property of the particle assigned to the respective grid node, and further in dependence upon a distance to an adjacent particle in the body; and iterating through a first plurality of time steps in a simulation period, at each particular time step re-assigning the first particles in the body portion to nodes in the plurality of nodes in dependence upon the node equations and the particle assignments at the beginning of the particular time step, wherein iterating through the first plurality of time steps comprises, for a given one of the node equations during one of the iterations, approximating the distance to the adjacent particle as the distance between the given node and the grid node to which the adjacent particle is assigned.

16. The non-transitory computer readable medium of claim 15, wherein each of the assignments of a first particle to a grid node comprises storing, in association with each grid node to which a particle is assigned, an identification of an actual position in the body portion of the particle assigned to the respective grid node, and wherein the logic comprises:

determining, for each particular one of the grid nodes to which a particle is assigned, whether the particular node is within a predetermined neighborhood of a material border;

if the particular node is within the predetermined neighborhood of a material border, then for the particular node equation, determining the distance to an adjacent particle in dependence upon the actual particle positions as stored in association with the particular node and the node to which the adjacent particle is assigned; and if the particular node is not within the predetermined neighborhood, then for the particular node equation, approximating the distance to the adjacent particle as the distance between the particular grid node and the grid node to which the adjacent particle is assigned.

17. A computer-implemented method for simulating a temporal process in a body portion, the body portion including first particles of a first particle type, comprising:

a computer system assigning each of the first particles in the body portion to a corresponding one of a plurality of nodes in a uniform grid of nodes imposed on the body portion, the grid having three independent dimensions and having a uniform node spacing which is within ±10% of 0.27 nanometers, the first particles being disposed in a crystal lattice structure having vertices which do not coincide with any nodes of the uniform grid;

providing a system of discrete time probability node equations, at least one of the node equations for each of the plurality of nodes of the grid to which a particle is assigned, each of the node equations describing probability of a predetermined physical event type occurring at the respective grid node during a predetermined time period, in dependence upon a material property of the particle assigned to the respective grid node, and further in dependence upon a distance to an adjacent particle in the body; and a computer system iterating through a first plurality of time steps in a simulation period, at each particular time step re-assigning the first particles in the body portion to nodes in the plurality of nodes in dependence upon the node equations and the particle assignments at the beginning of the particular time step, wherein iterating through the first plurality of time steps comprises, for a given one of the node equations during one of the iterations, approximating the distance to the adjacent particle as the distance between the given node and the grid node to which the adjacent particle is assigned.

* * * * *